(12) United States Patent
Mitsuda et al.

(10) Patent No.: US 7,636,232 B2
(45) Date of Patent: Dec. 22, 2009

(54) ELECTRIC DOUBLE LAYER CAPACITOR

(75) Inventors: Kenro Mitsuda, Tokyo (JP); Yoshiyuki Takuma, Tokyo (JP); Daigo Takemura, Tokyo (JP); Kazuki Kubo, Tokyo (JP); Tetsuo Mitani, Tokyo (JP); Fumiyuki Miyamoto, Tokyo (JP); Takashi Masuda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/260,222

(22) Filed: Oct. 29, 2008

(65) Prior Publication Data

US 2009/0059473 A1 Mar. 5, 2009

Related U.S. Application Data

(62) Division of application No. 11/395,316, filed on Apr. 3, 2006, now Pat. No. 7,463,478.

(30) Foreign Application Priority Data

Apr. 21, 2005 (JP) ............................ 2005-123557
Feb. 14, 2006 (JP) ............................ 2006-035976
Feb. 16, 2006 (JP) ............................ 2006-038787

(51) Int. Cl.
H01G 9/00 (2006.01)
(52) U.S. Cl. .................. 361/502; 361/504; 361/508; 361/512; 361/523; 361/528
(58) Field of Classification Search ......... 361/502–504, 361/508–512, 516–519, 523–525, 528–529
See application file for complete search history.

(56) References Cited

U.S. PATENT DOCUMENTS

| | | | |
|---|---|---|---|
| 5,862,035 A * | 1/1999 | Farahmandi et al. ........ 361/502 |
| 5,928,483 A | 7/1999 | Szpak et al. |
| 6,433,997 B1 * | 8/2002 | Noguchi et al. ............. 361/511 |
| 6,442,015 B1 | 8/2002 | Niiori et al. |
| 6,552,894 B2 * | 4/2003 | Matsuoka et al. ........... 361/502 |
| 6,603,653 B2 * | 8/2003 | Matsuoka et al. ........... 361/502 |
| 7,082,027 B2 * | 7/2006 | Nobuta et al. ............... 361/502 |
| 7,088,572 B2 * | 8/2006 | Yoshida et al. .............. 361/504 |
| 7,307,830 B2 * | 12/2007 | Gallay et al. ................ 361/502 |
| 2002/0163773 A1 * | 11/2002 | Niiori et al. ................. 361/512 |

FOREIGN PATENT DOCUMENTS

DE   43 01 549 C1   9/1994
EP   1 018 755 A2   7/2000

(Continued)

*Primary Examiner*—Nguyen T Ha
(74) *Attorney, Agent, or Firm*—Leydig, Voit & Mayer, Ltd.

(57) ABSTRACT

A porous electrolytic solution reservoir which is capable of being impregnated with an electrolytic solution is provided in an exterior case so as to make contact with a separator. The average diameter of the pores in the electrolytic solution reservoir is greater than the average diameter of pores in the separator. The electrolytic solution reservoir is impregnated with a predetermined amount of electrolytic solution, so that the occupation ratio of electrolytic solution within the pores in the separator becomes 50% or more when fully charged, and the occupation ratio of electrolytic solution within the pores in the electrolytic solution reservoir becomes 100% or less when fully discharged.

10 Claims, 26 Drawing Sheets

FOREIGN PATENT DOCUMENTS

| | | |
|---|---|---|
| EP | 1 189 243 A2 | 3/2002 |
| JP | 11/150042 A | 6/1999 |
| JP | 2004-289130 A | 10/2004 |
| JP | 2005-129924 A | 5/2005 |
| WO | WO 2004/079759 A2 | 9/2004 |

* cited by examiner

ELECTRIC DOUBLE LAYER CAPACITOR

BACKGROUND OF THE INVENTION

1. Field of the Invention

The present invention relates to an electric double layer capacitor.

2. Description of the Background Art

As disclosed in Japanese Patent Application Laid-Open No. 11-150042 (1999), electric double layer capacitors are provided with polarized electrodes (positive electrode and negative electrode) which face each other with a separator placed in between so that the capacitance of the electric double layers, which are formed on the surface of the polarized electrodes in the electrolytic solution, is used. Electric double layer capacitors are characterized in that an extremely large capacitance can be obtained in comparison with general capacitors such as aluminum capacitors, they have started being used in a wide range of applications such as a back up for electronic equipment, power storage for consumer electronics and copying machines, power supply for the start up from an idle stop of an automobile, a power supply for a hybrid automobile, and power storage for peak shaving and leveling of wind power and photovoltaic power generation, and are expected to be key devices that are useful for energy conservation and eliminating carbonic acid gas.

Electric double layer capacitors have different forms such as button type, layered type and spiral type, and in any case are formed by alternately layering positive electrodes and negative electrodes, which are formed of polarized electrodes mainly made of carbon particles such as activated carbon, and separators which separate these two types of electrodes within an exterior case where a release valve is provided in which the inside has been impregnated with an electrolytic solution (a solution in which electrolyte is dissolved or an ionic liquid).

No chemical reactions occur at the time of charging and discharging of electric double layer capacitors, and therefore, they have advantages in which a large amount of current can be instantly charged and discharged, and the efficiency in the charging and the discharging is high. They also have other advantages in which charging and discharging is possible no less than 100,000 times, the lifetime is 10 years or more and the reliability is high. On the other hand, there is a disadvantage in that the energy density is low in comparison with lithium ion batteries and the like.

Therefore, an attempt has been made to enhance the energy density of electric double layer capacitors by optimizing the combination of the diameter of the pores of the carbon and the size of the electrolytic solution or by using Nanogate carbon or nanocarbon. Japanese Patent Application Laid-Open No. 2004-289130, for example, discloses that non-porous carbon, where multiple graphene layers are developed, is used, and thereby, the energy density can be increased close to six times higher than that of the conventional art. In addition, it is also known that the energy density can be enhanced by using nanocarbons such as carbon nanotubes.

In addition, Japanese Patent Application Laid-Open No. 2005-129924 discloses that the capacitance is increased by using alkali activated carbons having special specifications, and thus, the energy density can be enhanced.

In the case where a carbon having a high energy density is used as the material for electrodes, however, the electrodes expand at the time of charging and the electrodes contract at the time of discharging. This is because intercalation causes the volume to expand when the electrolytic solution is absorbed by the carbon in the electrodes at the time of charging, and the volume contracts when the electrolytic solution that has been absorbed by the electrodes is discharged to the outside of the electrodes at the time of discharge. In the case where Nanogate carbon or alkali activated carbon, for example, is used as the material of the electrodes, expansion of approximately 20% to 30% occurs at the time of charging, and contraction of approximately 20% to 30% occurs at the time of discharge.

In the case where an electrode expands at the time of discharge, the electrolytic solution with which a separator has been impregnated moves toward the electrode side, and the electrolytic solution with which a separator has been impregnated becomes insufficient, creating voids in the pores of a separator. As a result, a problem arises where the electric resistance of a separator becomes high.

In addition, when an electrode contracts at the time of discharge, the electrolytic solution that has been discharged from the electrode moves toward the separator side, and the electrolytic solution that cannot be contained in the separator flows over to the outside of the exterior case through a release valve. As a result, the electrolytic solution within the exterior case becomes insufficient, making the lifetime shorter, and a problem arises where the overflowed electrolytic solution causes electric short circuiting or erosion in an external circuit.

The problem of the shortage of the electrolytic solution can also arise in the case where the temperature becomes high during the operation of the electric double layer capacitor. This is caused by leaking of the electrolytic solution in liquid form from the release valve to the outside of the exterior case together with the electrolytic solution that has been decomposed and turned into a gas and carbon dioxide, which has been generated when carbon is decomposed.

Meanwhile, the expansion/contraction of the electrodes occurs only in the direction of the layering, and therefore, it is possible to reduce the expansion/contraction of the electrodes to approximately 10% by applying surface pressure to the main portions of a large cell so that the change in the amount of the electrolytic solution in the separators can be suppressed. In the case where the expansion/contraction of the electrodes is suppressed, however, the electrolytic solution does not enter into the electrodes and the area of the electric double layers is not sufficiently expanded, and thus, an increase in the capacitance stays at approximately 1.5 times in comparison with the case of conventional activated carbon. In the case where the expansion/contraction of 20% to 30% is allowed so that the electrodes are quickly filled in with a sufficient amount of electrolytic solution at the time of charging and the electrolytic solution is quickly discharged at the time of discharge, the capacitance increases to three times as much.

SUMMARY OF THE INVENTION

An object of the present invention is to provide an electric double layer capacitor which can prevent an increase in the electric resistance of a separator and leaking of an electrolytic solution to the outside by maintaining the electrolytic solution with which the separator is capable of being impregnated at a constant amount, even in the case where the electrodes expand/contract at the time of charging and discharge.

A first electric double layer capacitor according to the present invention includes a cell portion, an exterior case in which the cell portion is contained and a porous electrolytic solution reservoir. The cell portion has a positive electrode and a negative electrode. The positive electrode and the negative electrode face each other with a porous separator that is impregnated with an electrolytic solution in between, expand at the time of charging and contract at the time of discharge. The electrolytic solution reservoir is placed within the exterior case so as to make contact with the separator and is capable of being impregnated with the electrolytic solution.

Even in the case where the electrodes expand/contract at the time of charging and discharge, the electrolytic solution with which the separator is impregnated can be kept at a constant amount by means of the electrolytic solution reservoir, and an increase in the electric resistance of the separator and leaking of the electrolytic solution to the outside of the exterior case can be prevented. In addition, even in the case where the electrolytic solution within the exterior case leaks to the outside due to an operation at a high temperature, the electrolytic solution reservoir makes it possible to avoid a situation where the amount of the electrolytic solution with which the separator is capable of being impregnated is immediately reduced.

A second electric double layer capacitor according to the present invention includes a cell portion and a porous electrolytic solution reservoir. The cell portion has two electrodes and two electricity collecting plates which are respectively connected to the two electrodes from the outside. The two electrodes face each other with a porous separator that is impregnated with an electrolytic solution in between, expand at the time of charging and contract at the time of discharge. The electrolytic solution reservoir makes contact with the separator and is capable of being impregnated with the electrolytic solution. At least one of the two electricity collecting plates has a region which does not make contact with the electrode in the main surface to which the electrode is connected. The electrolytic solution reservoir is not placed between the two electrodes, but is placed so as to face the region of the at least one electricity collecting plate.

The electrolytic solution reservoir is placed so as to face the region which does not make contact with the electrode in the main surface on the electrode side of the electricity collecting plate, and therefore, the electrolytic solution reservoir can be placed so as to be close to the portion of the separator which is placed between the two electrodes. Therefore, even in the case where the electrodes absorb the electrolytic solution as a result of expansion at the time of charging in such a manner that the electrolytic solution becomes insufficient in the separator, the electrolytic solution can be quickly supplied to the separator by the electrolytic solution reservoir. In addition, even in the case where the electrodes contract so as to release the electrolytic solution at the time of discharge and the electrolytic solution is overflowed from the separator, the electrolytic solution reservoir can quickly absorb and holds the electrolytic solution from the separator. Accordingly, the electrolytic solution with which the separator is capable of being impregnated can be kept at a constant amount while allowing the expansion/contraction of the electrodes at the time of the charging and discharge. As a result, an increase in the electric resistance of the separator and leaking of the electrolytic solution to the outside can be prevented while increasing the capacitance. Furthermore, the electrolytic solution reservoir is provided without being placed between the two electrodes, and therefore, no unnecessary member intervenes between the two electrodes. Accordingly, deterioration of the performance due to the positioning of the electrolytic solution reservoir does not occur.

A third electric double layer capacitor according to the present invention includes a cell portion and a porous electrolytic solution reservoir. The cell portion has a positive electrode and a negative electrode. The positive electrode and the negative electrode face each other with a porous separator that is impregnated with an electrolytic solution in between, expand at the time of charging and contract at the time of discharge. The electrolytic solution reservoir makes contact with the separator, has cushioning properties and is capable of being impregnated with the electrolytic solution. The electrolytic solution reservoir contracts when at least one of the positive electrode and the negative electrode expands, and expands when the at least one of these electrodes contracts.

The electrolytic solution reservoir contracts when the positive electrode or the negative electrode expands, and therefore, even in the case where the positive electrode and the negative electrode absorb the electrolytic solution as the result of expansion at the time of charging, and the electrolytic solution becomes insufficient in the separator that is placed between the positive electrode and the negative electrode, the electrolytic solution can be quickly supplied to the separator by the electrolytic solution reservoir. In addition, the electrolytic solution reservoir expands when the positive electrode or the negative electrode contracts, and therefore, even in the case where the positive electrode and the negative electrode discharge the electrolytic solution as a result of contraction at the time of discharge, and the electrolytic solution over flows from the separator that is placed between the positive electrode and the negative electrode, the electrolytic solution reservoir can quickly absorb and hold the electrolytic solution from the separator. Accordingly, the electrolytic solution with which the separator is impregnated can be kept at a constant amount while allowing sufficient expansion/contraction of the positive electrode and the negative electrode at the time of charging and discharge. As a result, the capacitance can be increased while an increase in the electric resistance of the separator and leaking of the electrolytic solution to the outside can be prevented.

These and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments of the present invention are described with reference to the drawings. Elements to which the same symbols are attached in the respective drawings indicate the same or corresponding elements.

First Embodiment

Figure 1:
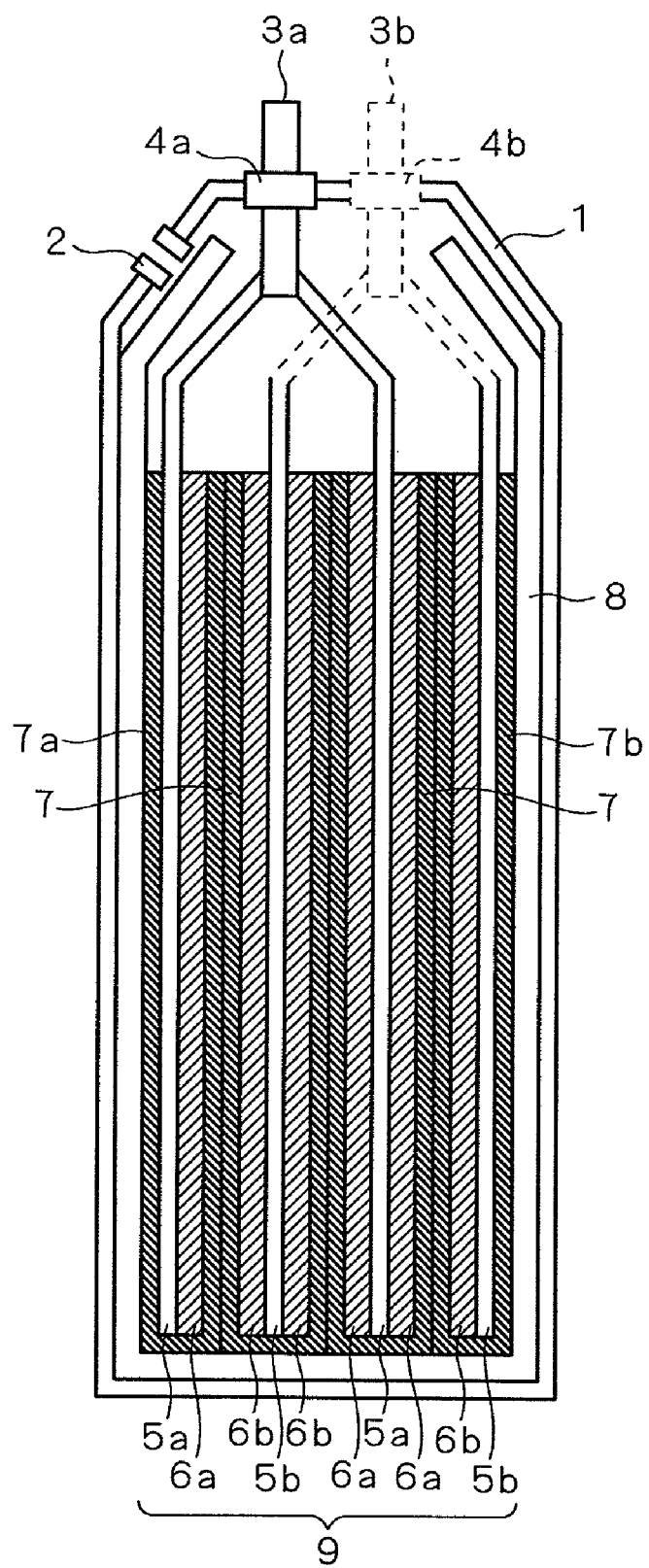
FIG. 1 is a sectional view showing the structure of an electric double layer capacitor according to a first embodiment of the present invention.
Figure 2:
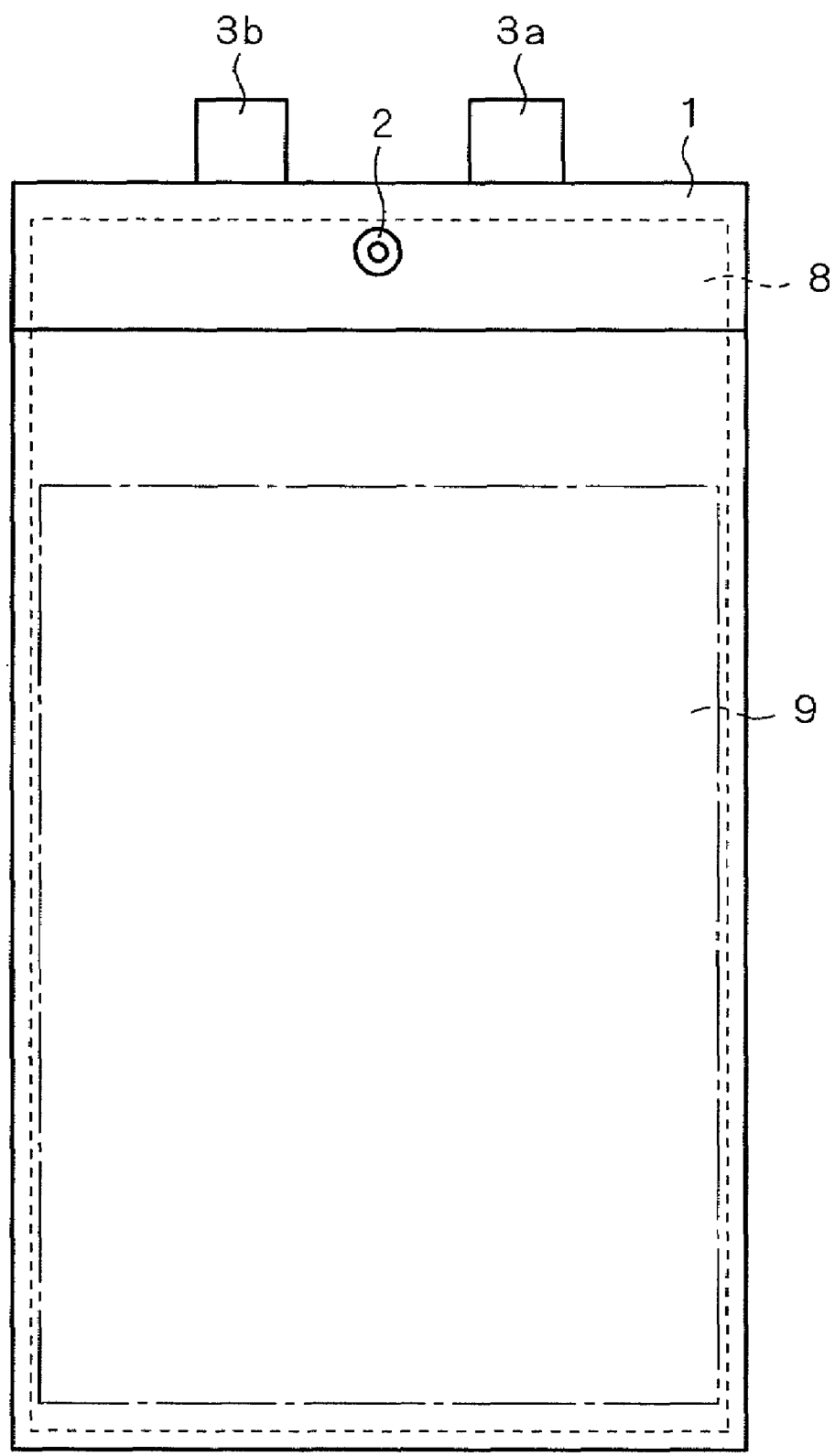
FIG. 2 is a front view showing the structure of the electric double layer capacitor according to the first embodiment of the present invention.

FIGS. 1 and 2 are respectively a sectional view and a front view showing the structure of an electric double layer capacitor according to a first embodiment of the present invention. With reference to FIGS. 1 and 2, a plurality of pairs of positive electrodes 6a and negative electrodes 6b, which face each other with a porous separator 7 placed in between, are layered on each other, and thereby, a cell portion 9 is formed. As for the positive electrodes 6a and the negative electrodes 6b, layers having a thickness of several hundreds of μm, where activated carbons or Nanogate carbons which each have a size of approximately 10 μm are bounded using a fluorine-based resin such as PTFE (polytetrafluoroethylene) as a binder, are used.

The positive electrodes 6a are formed on positive electricity collecting plates 5a and the negative electrodes 6b are formed on negative electricity collecting plates 5b. As for the positive electricity collecting plates 5a, aluminum foil is used and the positive electrodes 6a are formed on one side or the two sides of the positive electricity collecting plates 5a. In the same manner, aluminum foil is used as the negative electricity collecting plates 5b, and the negative electrodes 6b are formed on one side or the two sides of the negative electricity collecting plates 5b. The positive electricity collecting plates 5a are connected to a positive electrode terminal 3a, and the positive electrode terminal 3a is sealed with a sealing portion 4a and protrudes to the outside of an exterior case 1. In the same manner, the negative electricity collecting plates 5b are connected to a negative electrode terminal 3b, and the negative electrode terminal 3b is sealed with a sealing portion 4b and protrudes to the outside of the exterior case 1.

The cell portion 9 is contained within the exterior case 1. As for the exterior case 1, a laminated film, where a resin such as polyethylene is laminated on the surface of aluminum foil, is used. A release valve 2 is provided to the exterior case 1. A small penetrating hole is provided in the release valve 2, and this penetrating hole is usually closed with the valve, and the valve opens, and thus, the penetrating hole opens, when the internal pressure of the exterior case 1 becomes high, and thereby, the gas within the exterior case 1 is released to the outside.

As for the separator 7, firyl including forms or porous films such as nylon 66, aromatic polyamide, fully aromatic polyamide, aromatic polyester, fully aromatic polyester, fully aromatic polyester amide, fully aromatic polyether, fully aromatic polyazo compound, polyphenylene sulfide (PPS), poly-p-phenylene benzobisthiazole (PBZT), poly-p-phenylene benzobisoxazole (PBO), polybenzimidazole (PBI), polyether ether ketone (PEEK), polyamide imide (PAI), polyimide and polytetrafluoroethylene (PTFE), in addition to cellulose-based films such as natural pulp, natural cellulose, solvent-spun cellulose and bacteria cellulose, as well as non-woven cloths which contain glass fibers or non-fibril organic fibers are used. The thickness of the separator 7 is approximately 20 µm to 50 µm, the porosity (void volume) is approximately 60% to 80% and the material of which the average diameter of pores is several µm to several tens of µm is used. The average diameter of pores varies and can be easily changed by adjusting the mass per unit area for the same material. The average diameter of pores can be easily measured using a commercially available mercury penetration type porosimeter or a gas adsorption analyzer. In addition, it is also possible to hand out samples to an analysis maker and entrust analysis.

A porous electrolytic solution reservoir 8 which is capable of being impregnated with an electrolytic solution is provided within the exterior case 1 so as to make contact with the separator 7. In the example shown in FIG. 1, the electrolytic solution reservoir 8 is provided in a gap between the sides and the bottom of the cell portion 9 and the inner walls of the exterior case 1. As for the electrolytic solution reservoir 8, the same materials as those of the separator 7 can be used.

As for the electrolyte, combinations of a cation and an anion are used wherein, for example, the cation is quaternary ammonium, 1,3-dialkyl-imidazolium, or 1,2,3-trialkyl-imidazolium and the anion is a salt of $BF_4^-$, $PF_6^-$, $ClO_4^-$ or $CF_3SO_3^-$ or a salt of $AlCl_4^-$ or $BF_4^-$ of 1-ethyl-3-methyl-imidazolium (EMI), 1,2-dimethyl-3-propyl-imidazolium (DMPI). As for the solvent, one type selected from among propylene carbonate, ethylene carbonate, dimethyl carbonate, diethyl carbonate, dimethoxymethane, diethoxyethane, γ-butyrolactone, acetonitrile and propionitrile, or a mixed solvent of two or more types of these is used. The electrolytic solution in the present invention means a solution in liquid for that contains any of these electrolytes.

Figure 3:
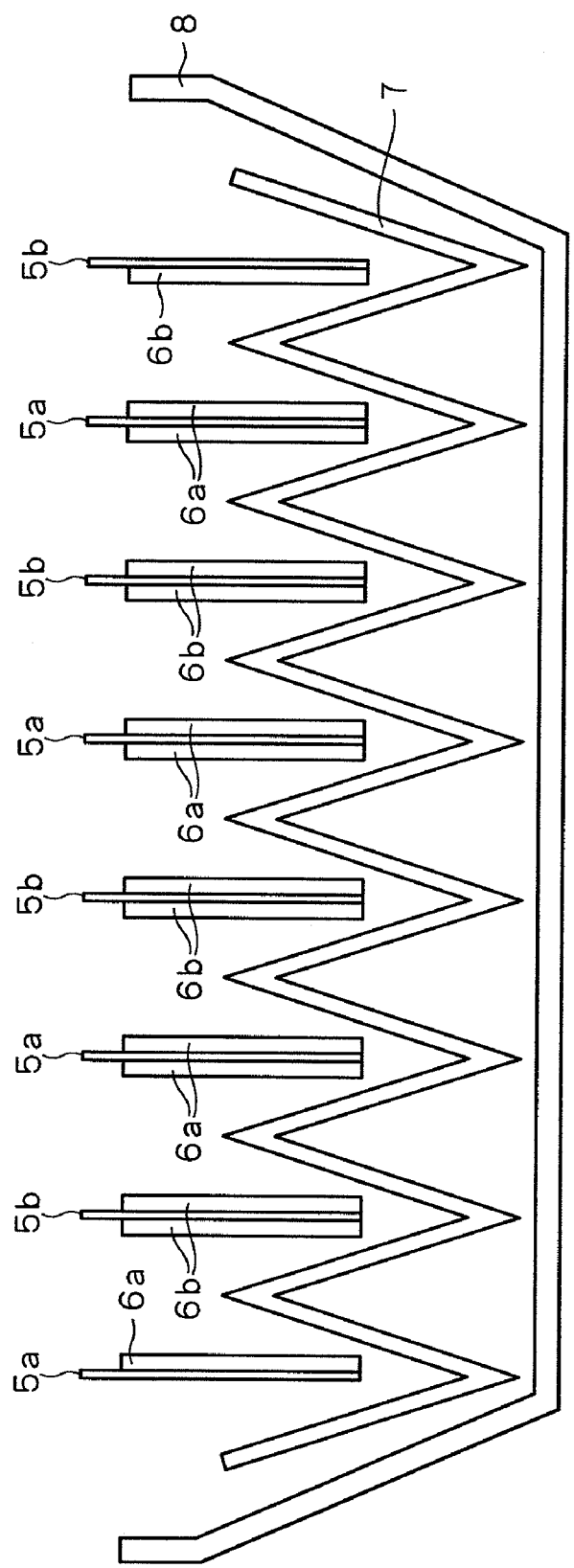
FIG. 3 is a side view schematically showing positional relationships between positive electrodes, negative electrodes, a separator and an electrolytic solution reservoir.

FIG. 3 is a side view schematically showing the positional relationships between positive electrodes 6a, negative electrodes 6b, the separator 7 and the electrolytic solution reservoir 8. The positive electrodes 6a and the negative electrode 6b are alternately sandwiched between the folded separator 7 and the electrolytic solution reservoir 8 is provided so as to cover the bottom and the sides of the separator 7.

Figure 4:
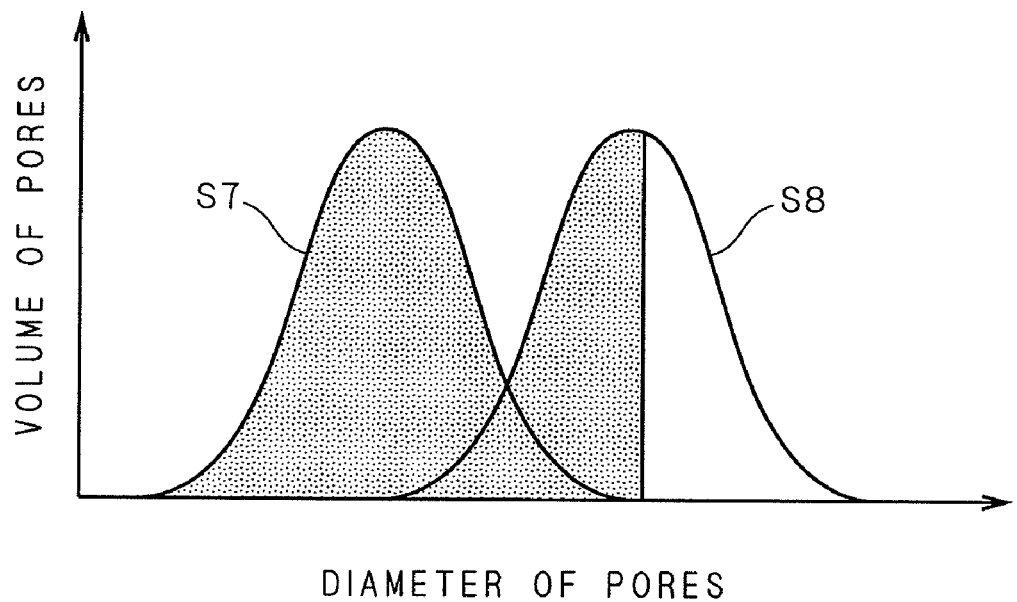
FIG. 4 is a graph showing the distribution in the diameter of the pores in the separator, the distribution in the diameter of the pores in the electrolytic solution reservoir and the occupation ratio of electrolytic solution within the pores when fully charged.
Figure 5:
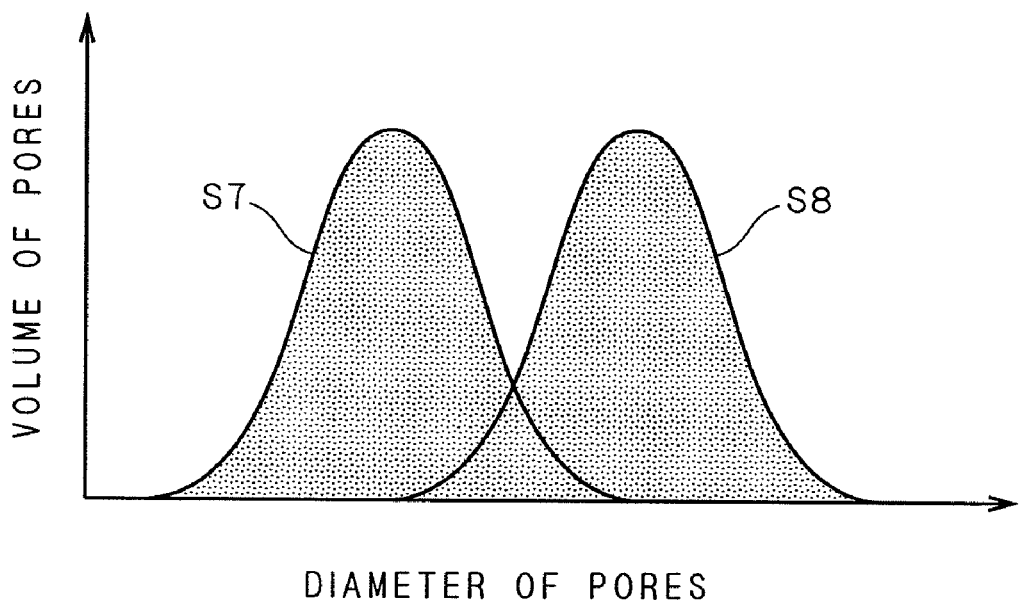
FIG. 5 is a graph showing the distribution in the diameter of the pores in the separator, the distribution in the diameter of the pores in the electrolytic solution reservoir and the occupation ratio of electrolytic solution within the pores when fully discharged.

FIG. 4 is a graph showing the distribution in the diameter of the pores in the separator 7 (S7), the distribution in the diameter of the pores in the electrolytic solution reservoir 8 (S8) and the occupation ratio of electrolytic solution within the pores when fully charged. In addition, FIG. 5 is a graph showing the distribution in the diameter of the pores in the separator 7 (S7), the distribution in the diameter of the pores in the electrolytic solution reservoir 8 (S8) and the occupation ratio of electrolytic solution within the pores when fully discharged. Here, the occupation ratio within the pores (hereinafter simply referred to as "occupation ratio") means the ratio of the volume within the pore that has been filled with the electrolytic solution relative to the total volume of the pores.

As shown in FIGS. 4 and 5, the average diameter of the pores in the electrolytic solution reservoir 8 is greater than the average diameter of the pores in the separator 7. Therefore, the occupation ratio of electrolytic solution within the pores in the separator 7 is maintained higher than that in the electrolytic solution reservoir 8 due to the difference in the suction force of the pores. This is because in the case where the contact angle between the surface of the separator 7 or the electrolytic solution reservoir 8 and the electrolytic solution is smaller than 90 degrees, a force of attracting the electrolytic solution into the separator 7 or the electrolytic solution reservoir 8 occurs as a result of capillarity, and the smaller the diameter of the pores is, the stronger the force becomes. When the contact angles are the same, pores are filled with the electrolytic solution sequentially starting from the pores having smaller diameters. Accordingly, as shown in FIG. 4, in the case where the amount of the electrolytic solution is smaller than the total volume of the pores in the electrolytic solution reservoir 8 and the separator 7, pores having a large diameter in the electrolytic solution reservoir 8 remain as a region which is not filled with the electrolytic solution.

As the time of full charge, the electrolytic solution is sucked into the carbon in the positive electrodes 6a and the negative electrodes 6b by means of the mechanism such as intercalation and when the volumes of the positive electrodes 6a and the negative electrodes 6b increase, the electrolytic solution moves from the separator 7 to the positive electrodes 6a and the negative electrodes 6b so that voids occur in portions of the pores in the separator 7. When voids occur in the separator 7, the electric resistance becomes high, the charging efficiency becomes low and the amount of heat generated by charging increases, increasing the temperature and thus, there is a risk that the life time may be shortened. In the electric double layer capacitor according to the first embodiment, however, the electrolytic solution in the pores having a large diameter in the electrolytic solution reservoir 8 moves toward the voids in the separator, so that the voids in the separator 7 are filled with the electrolytic solution.

In the example shown in FIG. 4, the occupation ratio of electrolytic solution within the pores in the separator 7 when fully charged is 100%. In this case, an increase in the electric resistance of the separator 7 does not occur at all. In the case where the occupation ratio of electrolytic solution within the pores in the separator 7 is 50% or more, however, the electrolytic solution within adjacent pores in the separator 7 is connected, and thus, the increase in the electric resistance falls within an allowable range. The amount of the electrolytic solution within the separator 7 becomes the smallest when fully charged, and therefore, in the case where the occupation ratio of electrolytic solution within the pores in the separator 7 when fully charged is 50% or more, the increase in the electric resistance of the separator 7 falls within an allowable range.

Meanwhile, when the positive electrodes 6a and the negative electrodes 6b contract at the time of discharge, the electrolytic solution that has been discharged from the positive electrode 6a and the negative electrode 6b moves toward the separator 7 side. When the occupation ratio of electrolytic solution within the pores within the separator 7 exceeds 100%, the electrolytic solution that can not be contained within the separator 7 is absorbed by the electrolytic solution reservoir 8. As a result of this, a situation where the electrolytic solution overflows to the outside of the exterior case 1 through the release valve 2 can be avoided. The amount of the electrolytic solution within the separator 7 becomes the greatest when fully discharged, and therefore, in the case where the occupation ratio of electrolytic solution within the pores in the electrolytic solution reservoir 8 is 100% or less when fully discharged, as shown in FIG. 5, leaking of the electrolytic solution to the outside of the exterior case 1 can be prevented.

As described above, the electrolytic solution reservoir 8 may be impregnated with a predetermined amount of the electrolytic solution in such a manner that the occupation ratio of electrolytic solution within the pores in the separator 7 becomes 50% or more when fully charged, and the occupation ratio of electrolytic solution within the pores in the electrolytic solution reservoir 8 becomes 100% or less when fully discharged. As a result, the increase in the electric resistance of the separator 7 at the time of charging can be made to fall within an allowable range, while leaking of the electrolytic solution to the outside can be prevented at the time of discharge.

Here, though it is desirable for the average diameter of the pores in the electrolytic solution reservoir 8 to be greater than the average diameter of the pores in the separator 7, even in the contrasting case where the average diameter of the pores in the electrolytic solution reservoir 8 is smaller than that of the separator 7, and the contact angle between the electrolytic solution and the separator 7 is smaller than the contact angle between the electrolytic solution and the electrolytic solution reservoir 8, suction force of the pores in the separator 7 becomes greater than that in the electrolytic solution reservoir 8, and therefore, the same effects can be obtained as those in the case where the average diameter of the pores is made different.

With reference to FIG. 1, the electrolytic solution reservoir 8 is provided in a gap between the exterior case 1 and the cell portion 9. In addition, the electrolytic solution reservoir 8 makes contact with a separator 7a on the positive electrode 6a that is located on the left end of the cell portion 9 and a separator 7b on the negative electrode 6b that is located on the right end of the cell portion 9. Concretely speaking, the electrolytic solution reservoir 8 and the separators 7a and 7b are made to closely adhere to each other through a large area, where the sides of these which are the main surfaces of these make contact with each other.

The electrolytic solution is transferred through the portions where the electrolytic solution reservoir 8 and the separators 7a and 7b make contact with each other. The electrolytic solution reservoir 8 and the separators 7a and 7b are made to closely adhere to each other through the respective main surfaces, and therefore, the electrolytic solution can be transferred efficiently. At the time of charging, the electrolytic solution moves from the electrolytic solution reservoir 8 to the separators 7a and 7b via the contact surfaces between the electrolytic solution reservoir 8 and the separators 7a and 7b. In addition the electrolytic solution moves toward the separator 7 in the center portion of the cell portion 9 due to the suction force of the pores. In contrast, at the time of discharge, the electrolytic solution moves from the separators 7a and 7b to the electrolytic solution reservoir 8 via the contact surfaces between the electrolytic solution reservoir 8 and the separators 7a and 7b. In addition, as shown in FIG. 1, the electrolytic solution reservoir 8 and the separators 7, 7a and 7b make contact with each other though the bottoms, and through these portions the electrolytic solution is transferred.

In electric double layer capacitors, energy is lost and converted to heat through resistances at the time of charging and discharging, increasing the temperature. In some cases, the temperature increases to 70 degrees or higher depending on the environments where they are installed, including those of automobiles. In such cases, the electrolytic solution is converted to a gas through oxidation and decomposition, and when the internal pressure of the exterior case one becomes higher than a predetermined value, the electrolytic solution in gas form is released from the release valve 2. At this time in the case where the electrolytic solution in liquid form is released through the release valve 2 together with the electrolytic solution in gas form, the amount of the electrolytic solution gradually decreases. In the electric double layer capacitor according to the first embodiment, however, as shown in FIG. 1, the electrolytic solution reservoir 8 is provided so as to extend to the portion between the release valve 2 and the cell portion 9. Accordingly, the electrolytic solution in liquid form which would be released to the release valve 2 is absorbed by the portion of the electrolytic solution reservoir 8 that extends to the vicinity of the release valve 2. As a result of this, a situation where the electrolytic solution in liquid form is released to the outside of the exterior case 1 can be prevented or avoided. In addition, even in the case where a portion of the electrolytic solution is released, an excessive electrolytic solution is stored in the electrolytic solution reservoir 8, and therefore, a sufficient amount of the electrolytic solution can be maintained within the separator 7. Accordingly, the electric double layer capacitor according to the first embodiment can ensure a longer lifetime and the reliability even for an operation at a high temperature.

As described above, in the electric double layer capacitor according to the first embodiment, the porous electrolytic solution reservoir 8 which is capable of being impregnated with the electrolytic solution is provided within the exterior case 1 so as to make contact with the separator 7. Accordingly, even in the case where the positive electrodes 6a and the negative electrodes 6b expand/contract at the time of charging and discharge, the amount of the electrolytic solution with which the separator 7 is impregnated can be maintained within a constant range. As a result of this, an increase in the electric resistance of the separator 7, and leaking of the electrolytic solution to the outside of the exterior case 1 can be prevented. In addition, even in the case where the temperature is high during operation, the electrolytic solution within the exterior case 1 can be suppressed or prevented from leaking so the outside through the release valve 2, and even in the case where it has leaked, a situation where the amount of the electrolytic solution with which the separator 7 is impregnated is quickly reduced can be avoided.

Second Embodiment

Figure 6:
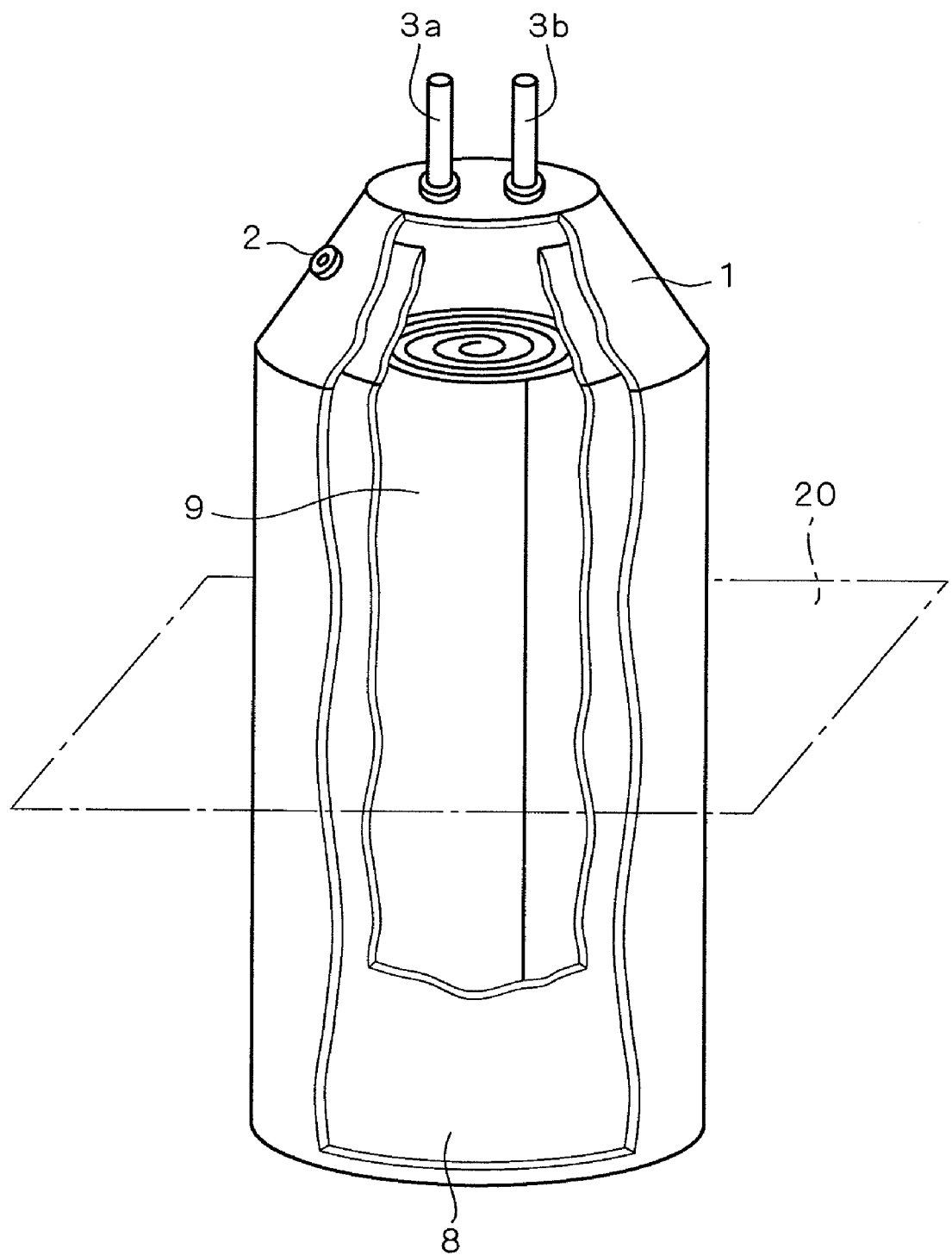
FIG. 6 is a perspective view showing the structure of an electric double layer capacitor according to a second embodiment of the present invention.

FIG. 6 is a perspective view showing the structure of an electric double layer capacitor according to a second embodiment of the present invention, and shows the electric double layer capacitor with a portion of the exterior case and the electrolytic solution reservoir 8 cut out. In addition, FIG. 7 is a sectional view schematically showing the structure of a cross section in the case where the electric double layer capacitor shown in FIG. 6 is cut along a virtual plane 20.

Figure 7:
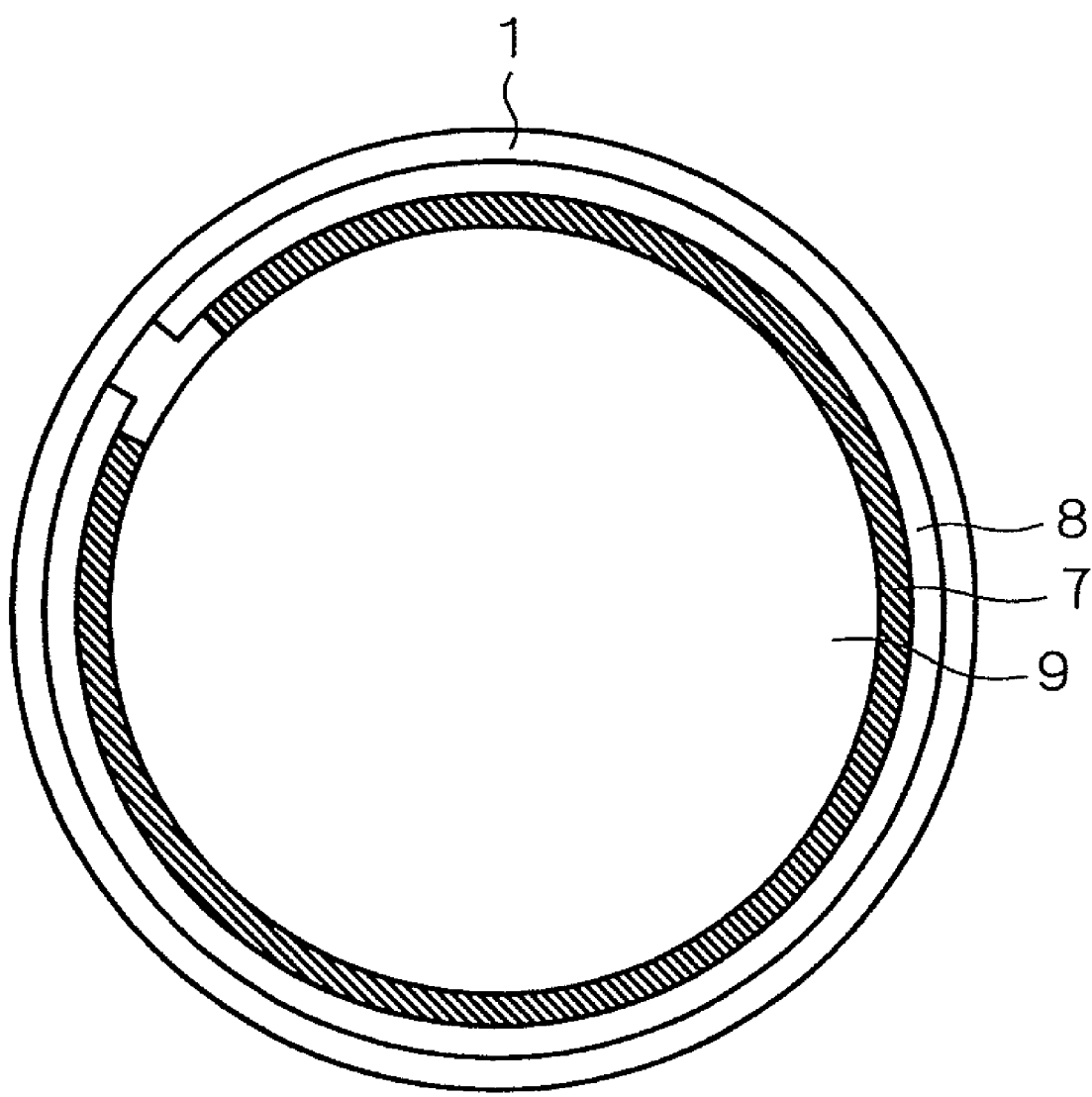
FIG. 7 is a sectional view schematically showing the structure of the cross section in the case where the electric double layer capacitor shown in FIG. 6 is cut by an imaginary plane.

Though an example of a layered type electric double layer capacitor is described in the first embodiment, as shown in FIGS. 6 and 7, the present invention can also be applied to a spiral type electric double layer capacitor.

In a spiral type electric double layer capacitor, unlike with the layered type, the respective sheets of a positive electrode 6a, a separator 7 and a negative electrode 6b are layered on top of each other and rolled, and thereby, a cell portion 9 is formed. In the electric double layer capacitor according to the second embodiment, the length of the sheet of the separator 7 is greater than the length of the respective sheets of the positive electrode 6a and the negative electrode 6b, so that the separator 7 is wound once around the outermost periphery of the cell portion 9 in the configuration. In addition, the electrolytic solution reservoir 8 is provided in a gap between the exterior case 1 and the cell portion 9. As shown in FIG. 7, the inner surface of the electrolytic solution reservoir 8 and the outer surface of the separator 7 around the outermost periphery make contact with each other. In addition, though not shown in the FIGS. 6 and 7, the electrolytic solution reservoir 8 and the separator 7 make contact with each other through the bottom, in the same manner as in the first embodiment.

In the same manner as in the layered type electric double layer capacitor, increase and decrease in the electrolytic solution within the separator 7 caused by the expansion/contraction of the positive electrode 6a and the negative electrode 6b is absorbed by the electrolytic solution reservoir 8 that has been provided in the spiral type electric double layer capacitor, and the amount of electrolytic solution within the separator can be maintained for a long time, even in the case where the electrolytic solution is reduced as a result of operation at a high temperature. As a result of this, the performance of the electric double layer capacitor can be prevented from lowering, and the effects of enhancing the lifetime and reliability can be obtained.

Third Embodiment

Figure 8:
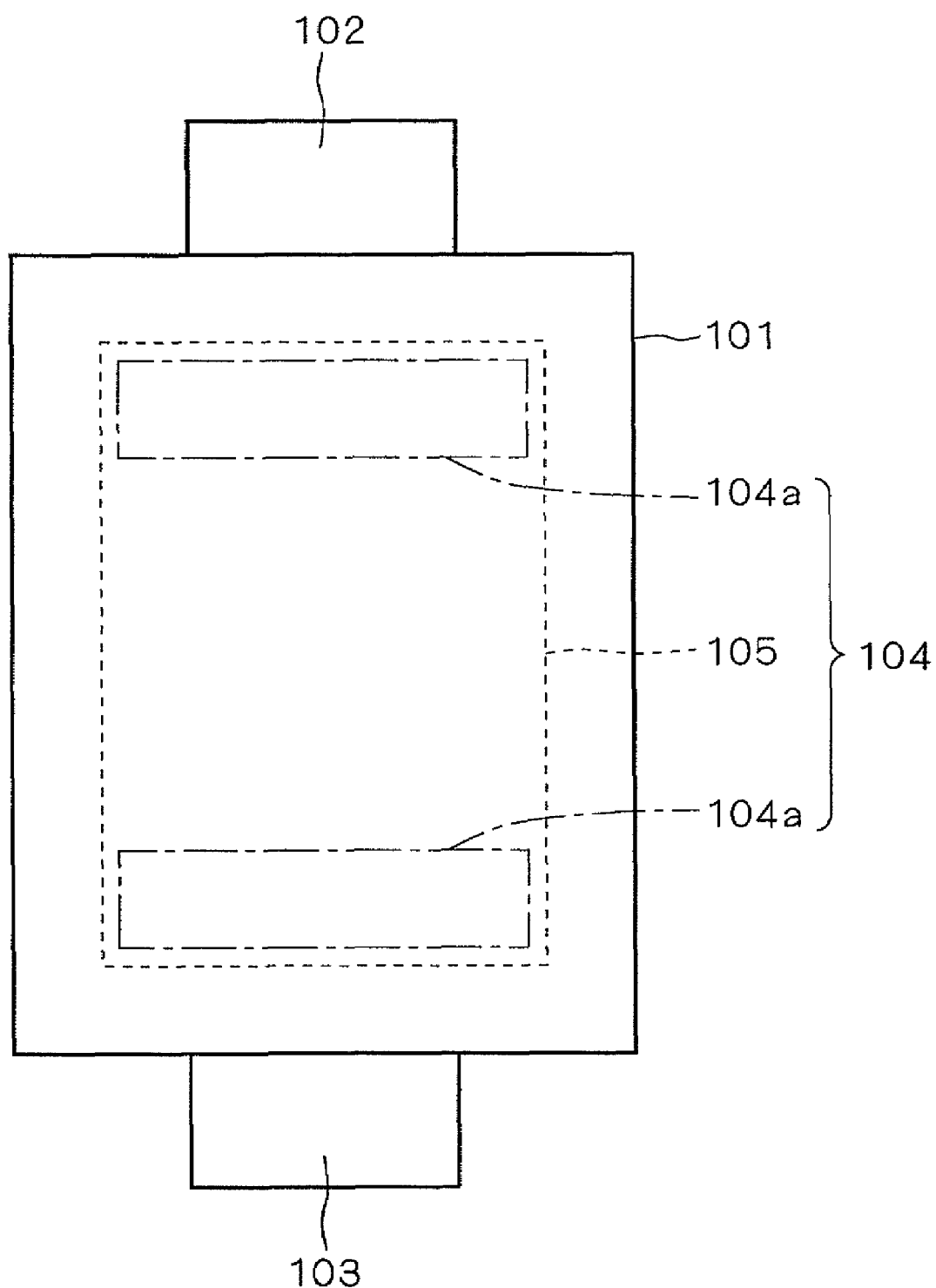
FIG. 8 is a front view showing the structure of an electric double layer capacitor according to a third embodiment of the present invention.

FIG. 8 is a front view showing the structure of an electric double layer capacitor according to a third embodiment of the present invention. As shown in FIG. 8, the electric double layer capacitor according to the third embodiment is provided with an exterior case 101, an electrolytic solution reservoir 104 and a cell portion 105 which are contained within this exterior case 101, a positive electrode terminal 102 and a negative electrode terminal 103. The electrolytic solution reservoir 104 is formed of a plurality of electrolytic solution reservoirs 104a.

Figure 9:
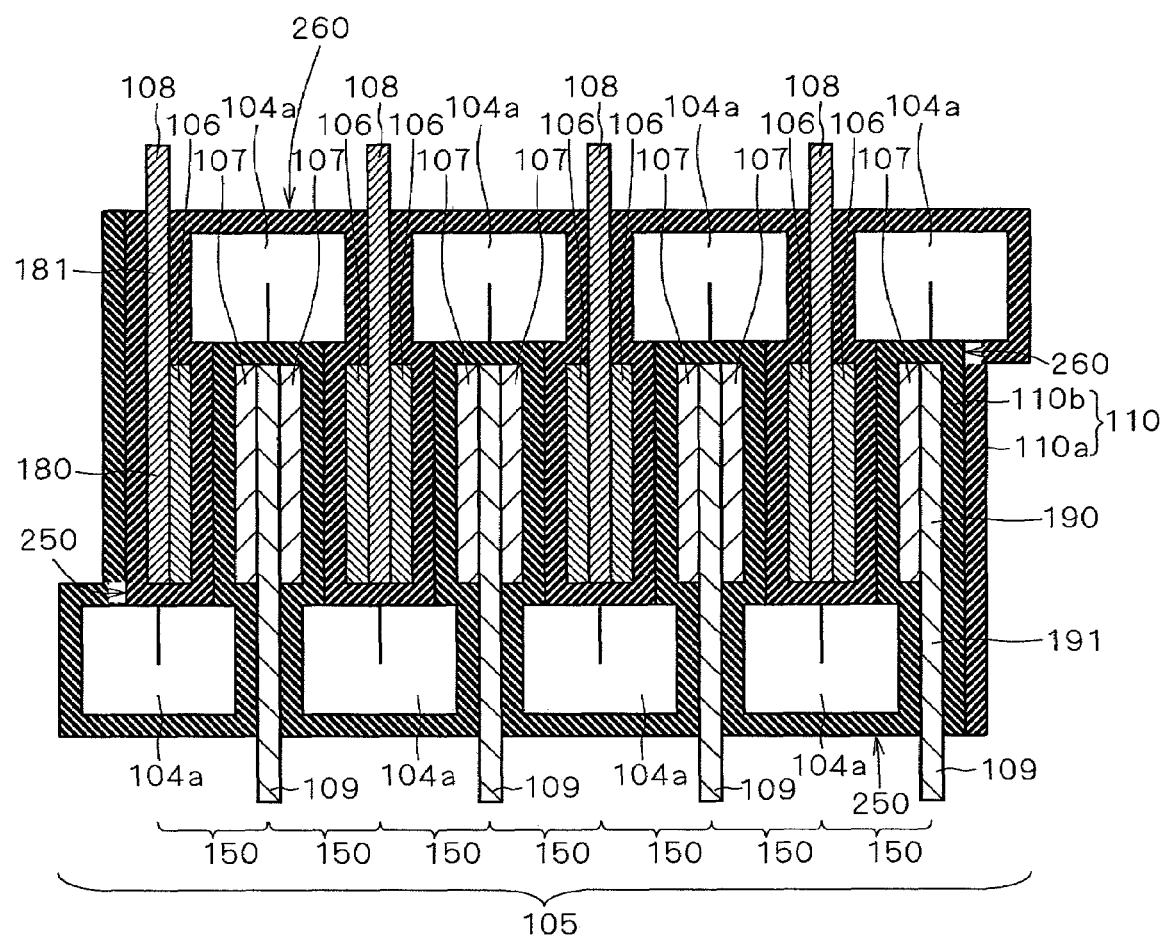
FIG. 9 is a sectional view showing the structure of the electric double layer capacitor according to the third embodiment of the present invention.
Figure 10:
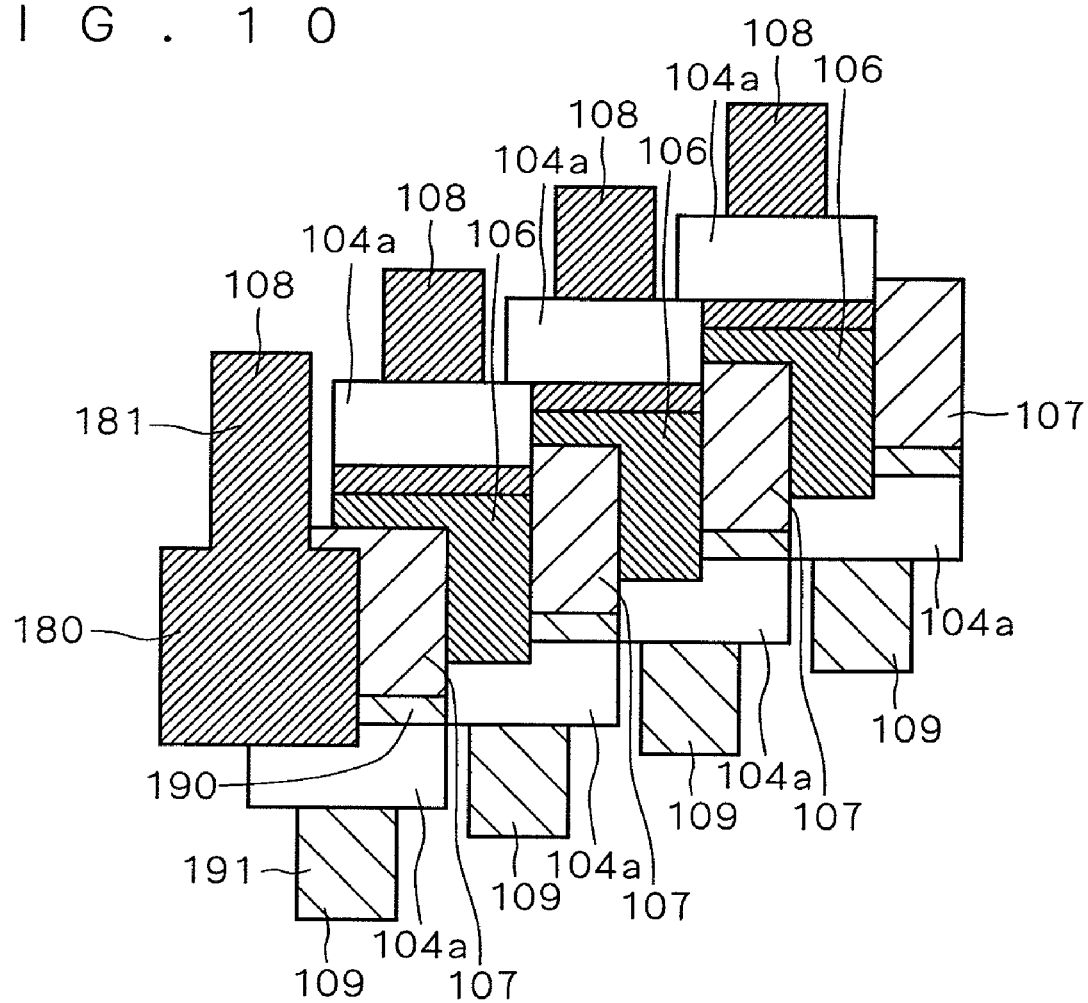
FIG. 10 is a perspective view showing the structure of the electric double layer capacitor according to the third embodiment of the present invention.

FIGS. 9 and 10 are a sectional view and a perspective view showing the structure of the electrolytic solution reservoir 104 and the cell portion 105 in a state where the two are contained within the exterior case 101, respectively. FIG. 10 does not show the separator 110 that is shown in FIG. 9, for the sake of convenience. As shown in FIGS. 9 and 10, the cell portion 105 has a structure where a plurality of pairs of a positive electrode 106 and a negative electrode 107 which face each other with a porous separator 110 intervening in between are layered on top of each other. The positive electrodes 106, the negative electrodes 107 and the separator 110 are impregnated with the electrolytic solution. The positive electrodes 106 and the negative electrodes 107 are made of layers having a thickness of several tens of μm to several mm, where activated carbons or Nanogate carbons which each have such a particle size that the diameter is approximately 10 μm are bounded by a binder of a fluorine-based resin, such as PTFE (polytetrafluoroethylene) or an SBR (styrene butadiene rubber)-based synthetic rubber.

The positive electrodes 106 are formed on positive electricity collecting plates 108, and the negative electrodes 107 are formed on negative electricity collecting plates 109. As a result, the positive electricity collecting plates 108 and the negative electricity collecting plates 109 are connected to the respective pairs of positive electrodes 106 and the negative electrodes 107, respectively, from the outside. As the positive electricity collecting plates 108, aluminum foils are used, and the positive electrodes 106, are formed on one side or two sides of the positive electricity collecting plates 108. Meanwhile, as the negative electrode collectors 109, aluminum foils or copper foils are used, and the negative electrodes 107 are formed on one side or two sides of the negative electricity collecting plates 109. The outer dimensions of the positive electrodes 106 and the negative electrodes 107 are, for example, 10 cm×10 cm. Hereinafter, the positive electrodes 106 and the negative electrodes 107 are generally referred to as "electrodes," and the positive electricity collecting plates 108 and the negative electricity collecting plates 109 are generally referred to as "electricity collecting plates."

A pair of a positive electrode 106 and a negative electrode 107 which face each other with a separator 110 in between and a positive electricity collecting plate 108 and a negative electricity collecting plate 109 which are connected to the positive electrode 106 and the negative electrode 107, respectively, in this pair form one unit cell 150. The cell portion 105 is provided with a plurality of unit cells 150. In the third embodiment, a plurality of positive electrodes 106 and negative electrodes 107 are placed in such a manner that electrodes of the same polarity are adjacent to each other in two unit cells 150 which are adjacent to each other. In addition, one electricity collecting plate is placed on the border between two unit cells 150 which are adjacent to each other, and this one electricity collecting plate is shared by the two electrodes having the same polarity which are adjacent to each other. That is, one collector is shared by two unit cells 150.

A positive electricity collecting plate 108 is formed of a positive electrode contacting portion 180 that makes contact with a positive electrode 106, and a positive electrode non-contacting portion 181 that does not make contact with any positive electrode 106. As shown in FIG. 10, positive electrode contacting portions 180 have approximately the same size as positive electrodes 106, and positive non-contacting portions 181 have a width that is smaller than that of positive electrode contacting portions 180. In addition, positive electrode non-contacting portions 181 extend upward from positive contacting portions 180, and are connected to the positive electrode terminal 102.

In the same manner, a negative electricity collecting plate 109 is formed of a negative electrode contacting portion 190 which makes contact with a negative electrode 107, and a negative electrode non-contacting portion 191 which does not make contact with any negative electrode 107. As shown in FIG. 10, negative electrode contacting portions 190 have approximately the same size as negative electrodes 107, while negative electrode non-contacting portions 191 have a width which is smaller than that of negative electrode contacting portions 190. In addition, the negative electrode non-contacting portions 191 extend downward from the negative electrode contacting portions 190, and are connected to the negative electrode terminal 103.

The positive electrode terminal 102 is sealed with a sealing portion, not shown, which is provided on the upper surface of the exterior case 101, and protrudes to the outside from the upper surface side of the exterior case 101, as shown in FIG. 8. Meanwhile, the negative electrode terminal 103 is sealed with a sealing portion, not shown, which is provided on the bottom of the exterior case 101, and protrudes to the outside from the bottom surface side of the exterior case 101, as shown in FIG. 8.

As described above, the positive electrode terminal 102 and the negative electrode terminal 103 are taken out on opposite sides of the exterior case 101, and thereby, the width of the positive electrode terminal 102 and the negative electrode terminal 103 can be increased. Furthermore, the width of the positive electricity collecting plates 108 and the negative electricity collecting plates 109 which are connected to these can be increased. As a result of this, the electric resistance of the positive electricity collecting portion which is formed of the positive electrode terminal 102 and the positive electricity collecting plates 108 can be reduced, and the electric resistance of the negative electricity collecting portion which is formed of the negative electrode terminal 103 and the negative electricity collecting plates 109 can be reduced.

The separator 110 according to the third embodiment is formed of two separators 110a and 110b which are provided so as to make contact with each other. Each of the separators 110a and 110b is continuous body which is formed by bending a single member so as to be placed between a positive electrode 106 and a negative electrode 107 in each unit cell 150. In addition, the separator 110a is provided so as to cover the larger part of the surface of the positive electrodes 106 and the positive electricity collecting plates 108 and make contact with these, while the separator 110b is provided so as to cover the larger part of the surface of the negative electrodes 107 and the negative electricity collecting plate 109. As for the material of the separator 110, the same material as that of the separator 7 can be used. The separators 110a and 110b respectively have a thickness of approximately 20 μm to 50 μm, a porosity (void volume) of approximately 60% to 80%, and an average diameter of pores of several μm to several tens of μm.

Reservoirs of electrolytic solution 104a are respectively formed of a porous material which is capable of being impregnated with the electrolytic solution, and make contact with both separators 110a and 110b. As the material of the electrolytic solution reservoirs 104a, the same material as that of the separators 110a and 110b can be used.

Half of a plurality of electrolytic solution reservoirs 104a are provided in the upper portion within the exterior case 101, and are placed in each unit cell 150 so as to face a region in the main surface of the positive electricity collecting plates 108 connected to the positive electrode 106 included in each unit cell 150, the region not making contact with the positive electrode 106. That is, an electrolytic solution reservoir 104a is placed so as to face the main surface of a positive electrode non-contacting portion 181 that is located on the positive electrode 106 side.

Meanwhile, the remaining half of the plurality of electrolytic solution reservoirs 104a are provided in the lower portion within the exterior case 101, and are placed in each unit cell 150 so as to face a region in the main surface of the negative electricity collecting plates 109 connected to the negative electrode 107 included in each unit cell 150, the region not making contact with the negative electrode 107. That is, in each unit cell 150, an electrolytic solution reservoir 104a is placed so as to face the main surface of a negative electrode non-contacting portion 191 that is located on the negative electrode 107 side. In addition, the electrolytic solution reservoirs 104a are not sandwiched between the positive electrodes 106 and the negative electrodes 107 in the respective unit cells 150.

As the electrolytes and the solvent, the same as those in the first embodiment can be used. As for the material of the exterior case 101, the same material as that of the exterior case 1 can be used. A release valve, not shown, is provided in the exterior case 101. A small penetrating hole is provided in the release valve, and though this penetrating hole is usually closed with a valve, the valve opens, and thus, the penetrating hole opens, when the internal pressure of the exterior case 101 becomes high, and thereby, the gas inside the exterior case 101 is released to the outside.

Figure 11:
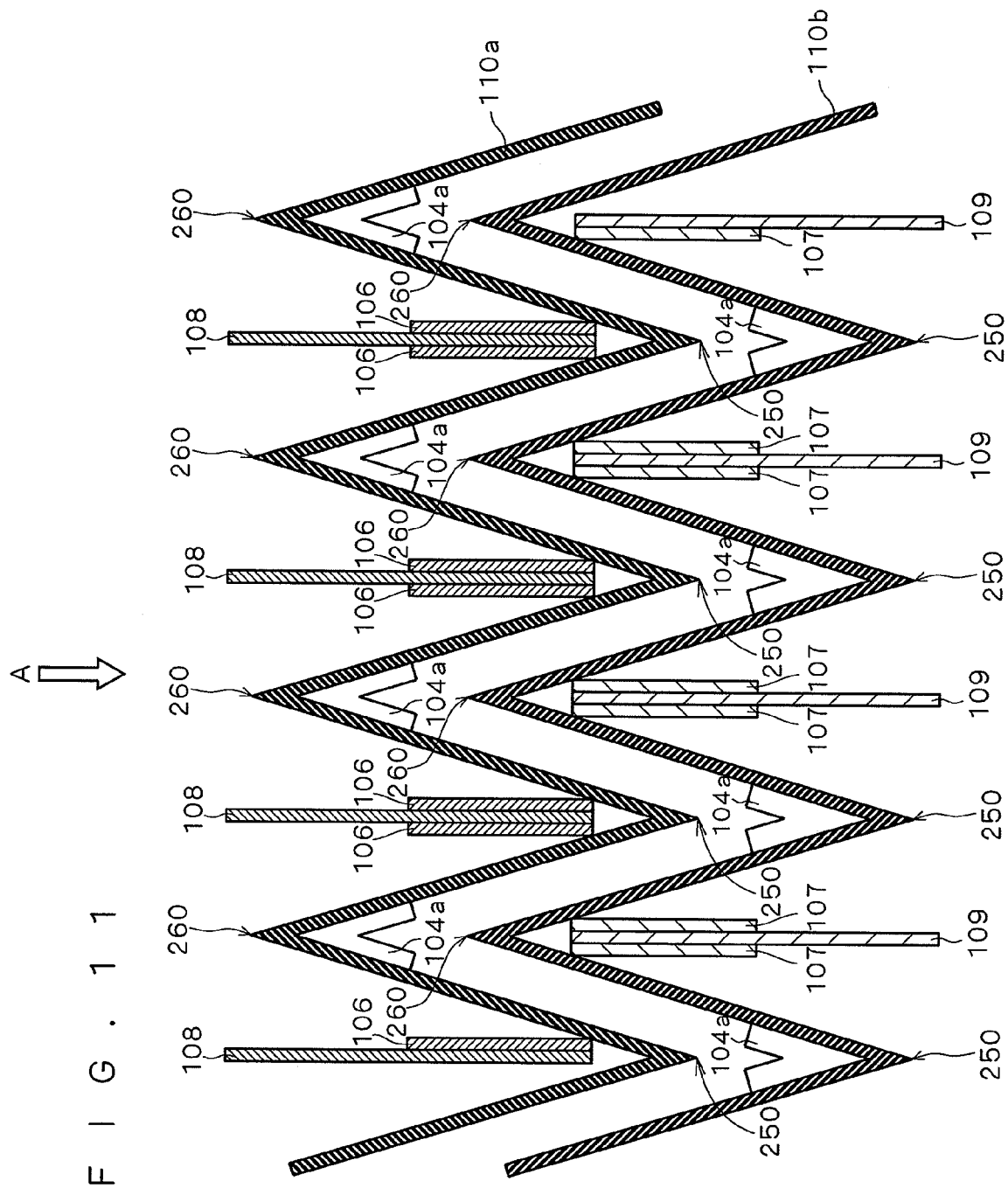
FIG. 11 is a sectional view showing the structure of the electric double layer capacitor according to the third embodiment of the present invention.
Figure 12:
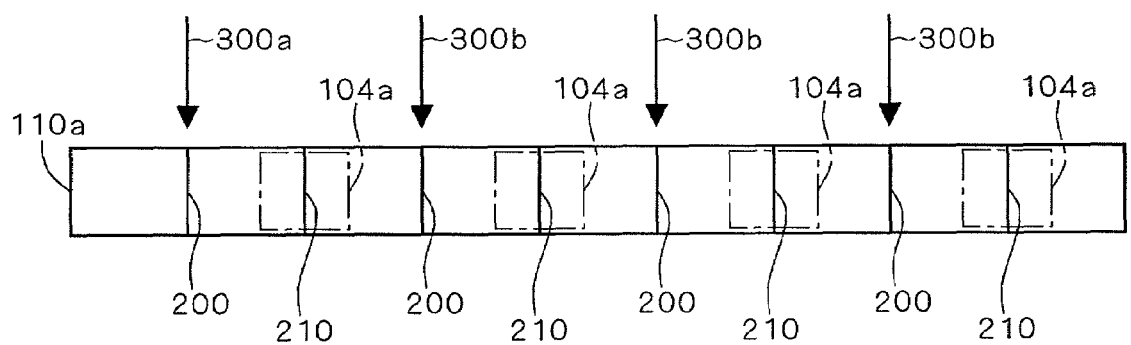
FIG. 12 is a plan view showing the structure of a separator according to the third embodiment of the present invention.
Figure 13:
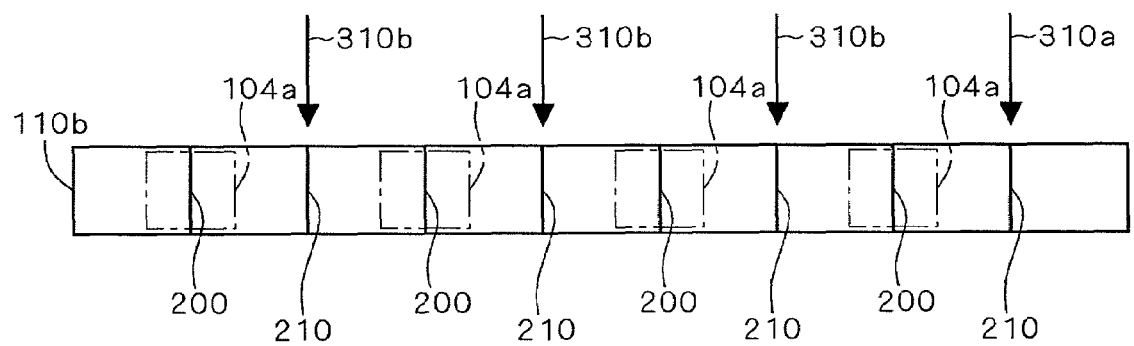
FIG. 13 is a plan view showing the structure of the separator according to the third embodiment of the present invention.

FIG. 11 is a sectional view showing the structure of the electrolytic solution reservoir 104 and the cell portion 150 in a state before the two are contained within the exterior case 101, and FIGS. 12 and 13 are plan views showing the structure of separators 110a and 110b, respectively, shown in FIG. 11, as viewed in the direction of arrow A. As shown in FIGS. 12 and 13, valley folds 200 and mountains folds 210 are alternately provided at constant intervals to each of the separators 110a and 110b, and as a result, the separators 110a and 110b respectively form bellows. In addition, in the separator 110a, positive electrodes 106 and positive electricity collecting plates 108 are located in valley fold portions 250, and electrolytic solution reservoirs 104a are folded and attached to the inside of mountain fold portions 260. Meanwhile, in the separator 110b, negative electrodes 107 and negative electricity collecting plates 109 are located in the mountain fold portions 260, and electrolytic solution reservoirs 104a are folded and attached to the inside of the valley fold portions 250. Here, the outer form of the electrolytic solution reservoirs 104a before being folded is, for example, 10 cm×2 cm.

When the separators 110a and 110b are folded, first, the electrolytic solution reservoirs 104a are placed on at constant intervals and made to adhere to the separators 110a and 110b, respectively, by means of adhesion, fusion, sewing or the like. Then, valley folds 200 and mountain folds 210 are alternately created in the separators 110a and 110b, respectively, using a press mold or the like. At this time, the electrolytic solution reservoirs 104a are also folded.

When the electrolytic solution reservoir 104 and the cell portion 150 are contained within the exterior case 101, the separator 110a and the separator 110b are made to overlap, so that the electrolytic solution reservoirs 104a which are provided in the mountain fold portions 260 of the separator 110a and the mountain fold portions 260 of the separator 110b make contact with each other, and the valley fold portions 250 of the separator 110a and the electrolytic solution reservoirs 104a which are provided in the valley fold portions 250 of the separator 110b make contact with each other, and after that, the positive electrodes 106 and the positive electricity collecting plates 108 are inserted into the valley fold portions 250 of the separator 110a, and the negative electrodes 107 and the negative electricity collecting plates 109 are inserted into the mountain fold portions 260 of the separator 110b. In addition, the separators 110a and 110b are folded in such a manner that the positive electrodes 106 and the positive electricity collecting plates 108 get caught in the valley fold portions 250 of the separator 110a, and the negative electrodes 107 and the negative electricity collecting plates 109 get caught in the mountain fold portions 260 of the separator 110b, respectively, and these elements are contained within the exterior case 101.

As described above, the electrolytic solution reservoir 104 and the cell portion 105 are contained within the exterior case 101, and then, as shown in FIG. 9, each of the mountain fold portions 260 of the separator 110a is placed so as to be shared by two unit cells 150 between the positive electrode non-contacting portions 181 of two positive electricity collecting plates 108 which face each other, and the electrolytic solution reservoirs 104a are placed so as to make contact with the inner side of these mountain fold portions 260. In addition, each of the valley fold portions 250 of the separator 110b is placed so as to be shared by two unit cells 150 between the negative electrode non-contacting portions 191 of two negative electricity collecting plates 109 which face each other, and the electrolytic solution reservoirs 104a are placed so as to make contact with the inner side of these valley fold portions 250.

Here, arrow 300a in FIG. 12 shows the point where a positive electricity collecting plate 108 where a positive electrode 106 is provided only on one side is inserted, and arrows 300b show the points where a positive electricity collecting plate 108 where positive electrodes 106 are provided on the two sides is inserted. In addition, arrow 310a in FIG. 13 shows the point where a negative electricity collecting plate 109 where a negative electrode 107 is provided only on one side is inserted, and arrows 310b show the points where a negative electricity collecting plate 109 where negative electrodes 107 are provided on the two sides is inserted.

In the electric double layer capacitor according to the third embodiment which has the configuration, when the positive electrodes 106 and the negative electrodes 107 expand by absorbing the electrolytic solution at the time of charging and contract by releasing the electrolytic solution at the time of discharge, the electrolytic solution is exchanged through portions where the electrolytic solution reservoir 104 and the separator 110 make contact with each other. At the time of charging, the positive electrodes 106 and the negative electrodes 107 absorb the electrolytic solution and expand, and the electrolytic solution with which the separator 110 is impregnated moves toward the positive electrodes 106 and the negative electrodes 7. Then, the electrolytic solution moves from the electrolytic solution reservoir 104 to the separator 110 via the contact surface between the electrolytic solution reservoir 104 and the separator 110.

In contrast, at the time of discharge, the positive electrodes 106 and the negative electrodes 107 discharge the electrolytic solution and contract, and the electrolytic solution moves toward the separator 110. Then, the electrolytic solution moves from the separator 110 to the electrolytic solution reservoir 104 via the contact surface between the electrolytic solution reservoir 104 and the separator 110.

In the third embodiment, the electrolytic solution reservoir 104a and the separators 110a and 110b are made to adhere to each other through the respective main surfaces, and therefore, the electrolytic solution can be exchanged efficiently.

Figure 14:
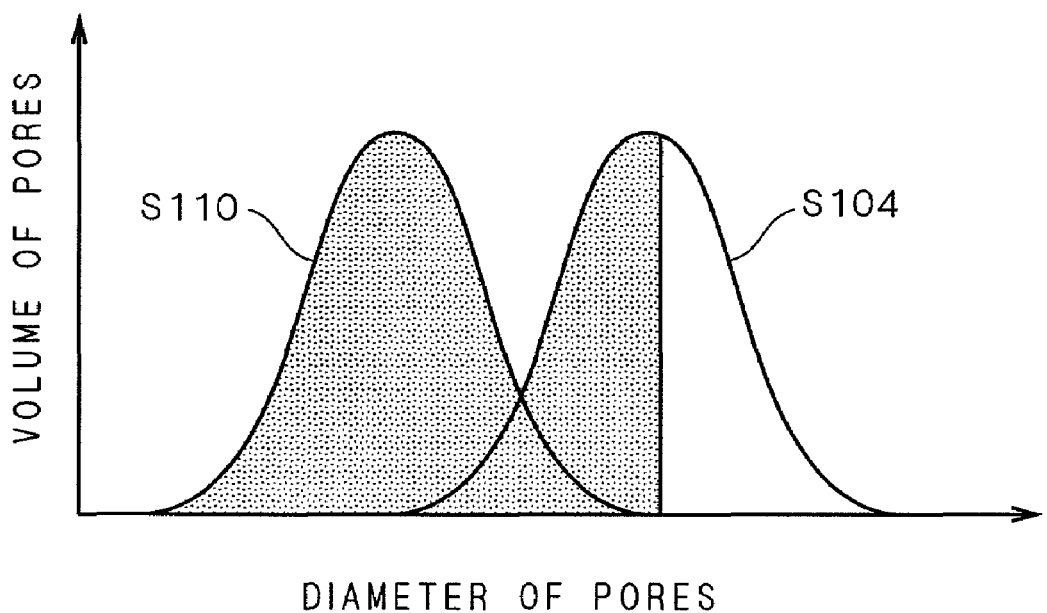
FIG. 14 is a graph showing the distribution in the diameter of the pores in the separator, the distribution in the diameter of the pores in the electrolytic solution reservoir and the occupation ratio of electrolytic solution within the pores when fully charged.

FIG. 14 is a graph showing the distribution in the diameter of the pores in the separator 110 (S110), the distribution in the diameter of the pores in the electrolytic solution reservoir 104 (S104) and the occupation ratio of electrolytic solution when fully charged. In addition, FIG. 15 is a graph showing the distribution in the diameter of the pores in the separator 110 (S110), the distribution in the diameter of the pores in the electrolytic solution reservoir 104 (S104) and the occupation ratio of electrolytic solution when fully discharged.

Figure 15:
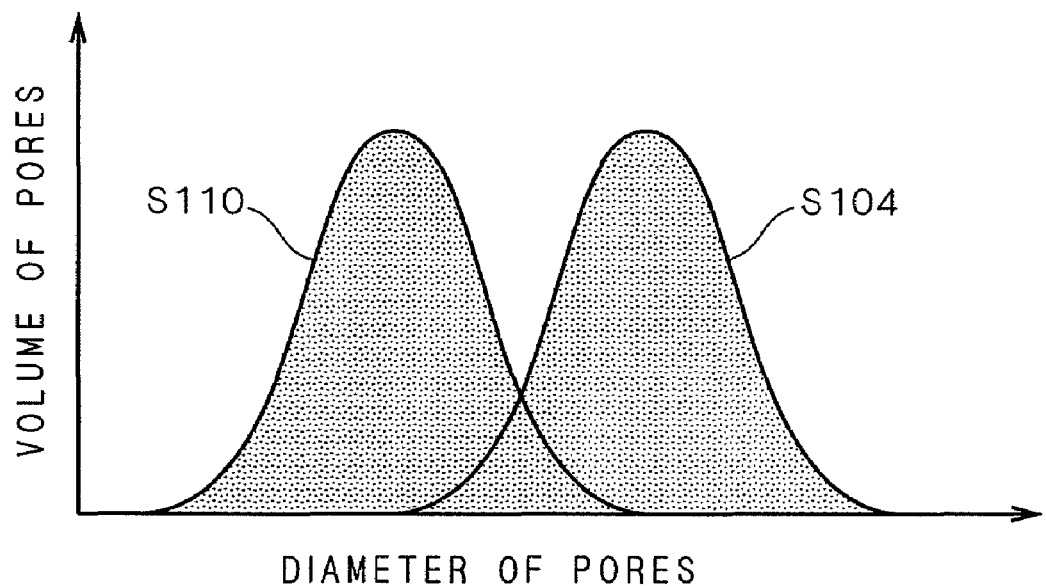
FIG. 15 is a graph showing the distribution in the diameter of the pores in the separator, the distribution in the diameter of the pores in the electrolytic solution reservoir and the occupation ratio of electrolytic solution within the pores when fully discharged.

As shown in FIGS. 14 and 15, in the same manner as in the first embodiment, the average diameter of the pores of the electrolytic solution reservoir 104 is greater than the average diameter of the pores of the separator 110. In addition, the average diameter of the pores of the electrolytic solution reservoir 104 is greater than the average diameter of the pores in the electrodes. Therefore, the occupation ratio of electrolytic solution within the pores of the separator 110 and the electrodes is maintained higher than that in the electrolytic solution reservoir 104, due to the difference in the suction force of the pores. This is because the smaller the diameter of the pores in the separator 110, the electrolytic solution reservoir 104 and the electrodes is, the stronger the suction force of these for drawing in the electrolytic solution as a result of the capillarity in the case where the contact angle of the surface of the separator 110, the electrolytic solution reservoir 104 and the electrodes, and the electrolytic solution is no greater than 90 degrees becomes. In the case where the contact angle is the same, the pores are sequentially filled with the electrolytic solution starting from that having a smaller diameter. In addition, the average diameter of the pores in the electrodes is smaller than the average diameter of the pores in the separator 110, and therefore, a state where the pores in the electrode are fully filled with the electrolytic solution is maintained. In the case where the amount of electrolytic solution is smaller than the total volume of the pores in the electrodes, the electrolytic solution reservoir 104 and the separator 110, pores having a large diameter in the electrolytic solution reservoir 104 remain as regions that are not filled with the electrolytic solution (area that is not hatched in FIG. 14).

When fully charged, and when the electrolytic solution is sucked into carbon in the positive electrodes 106 and the negative electrodes 107, due to a mechanism such as intercalation, and the volume of the positive electrodes 106 and the negative electrodes 107 increases, the electrolytic solution moves from the separator 110 to the positive electrodes 106 and the negative electrode 107 in such a manner that the voids are created in some of the pores of the separator 110. In the electric double layer capacitor according to the third embodiment, however, the electrolytic solution in pores having a large diameter in the electrolytic solution reservoir 104 moves toward the voids in the separator 110, and thus, these voids are filled with the electrolytic solution.

In the example shown in FIG. 14, the occupation ratio of electrolytic solution within the pores in the separator 110 when fully charged is 100%. In this case, the electric resistance of the separator 110 does not increase at all. In the same manner as in the first embodiment, however, in the case where the occupation ratio of electrolytic solution within the pores in the separator 110 is 50% or more, the electrolytic solution within adjacent pores is connected in the separator 110, and the increase in the electric resistance falls within an allowable range. The amount of electrolytic solution within the separator 110 becomes smallest when fully charged, and therefore, in the case where the occupation ratio of electrolytic solution within the pores in the separator 110 when fully charged is no smaller than 50%, the increase in the electric resistance of the separator 110 falls within an allowable range.

Meanwhile, when the positive electrodes 106 and the negative electrodes 107 make contract at the time of discharge, the electrolytic solution that has been discharged from the positive electrodes 106 and the negative electrodes 107 moves toward the separator 110. When the occupation ratio of the electrode within the pores in the separator 110 exceeds 100%, the electrolytic solution that cannot be contained in the separator 110 is absorbed by the electrolytic solution reservoir 104. As a result of this, a situation where the electrode overflows to the outside of the exterior case 101 through the release valve can be avoided. The amount of electrolytic solution within the separator 110 becomes greatest when fully discharged, and therefore, as shown in FIG. 15, in the case where the occupation ratio of electrolytic solution within the pores of the electrolytic solution reservoir 104 when fully discharged is 100% or less, leaking of the electrolytic solution to the outside of the exterior case 101 can be prevented.

As described above, the electrolytic solution reservoir 104 may be impregnated with a predetermined amount of electrolytic solution, in such a manner that the occupation ratio of electrolytic solution within the pores in the separator 110 when fully charged is 50% or more, and the occupation ratio of electrolytic solution within the pores in the electrolytic solution reservoir 104 when fully discharged is 100% or less.

As a result of this, the increase in the electric resistance of the separator 110 when fully charged can be kept within an allowable range while leaking of the electrolytic solution to the outside at the time of discharge can be prevented.

Here, in the same manner as in the first embodiment, though it is desirable for the average diameter of the pores in the electrolytic solution reservoir 104 to be greater than the average diameter of the pores in the separator 110, even in the case where the average diameter of the pores in the electrolytic solution reservoir 104 is smaller than the average diameter of the pores in the separator 110, the suction force of the pores becomes higher in the separator 110 than in the electrolytic solution reservoir 104 when the contact angle between the electrolytic solution and the separator 110 is smaller than that between the electrolytic solution and the electrolytic solution reservoir 104, and therefore, the same effects as in the case where the average diameter of the pores is made different can be obtained.

In an example of the third embodiment, separator paper for electric double layer capacitor "TF40," made by Nippon Kodoshi Corporation, is used as the separator 110, and "MPF45AC," made by the same, is used as the electrolytic solution reservoir 104. TF40 is made of solvent-spun regenerated cellulose fibers of which the average diameter of pores is 0.3 micrometers and the porosity is 73%. MPF45AC is made of polypropylene fibers of which the average diameter of pores is 4 micrometers and the porosity is 75%. The average diameter of pores differs by approximately 10 times or more between the separator 110 and the electrolytic solution reservoir 104, and therefore, the electrolytic solution of the separator 110 having a large suction force is first to occupy the electrolytic solution.

As described above, in the electric double layer capacitor according to the third embodiment, the electrolytic solution reservoir 104 is placed in such a manner as to face the regions which do not make contact with the positive electrodes 106 within the main surfaces of the positive electricity collecting plates 108 to which the positive electrodes 106 are connected. In addition, the electrolytic solution reservoir 104 is placed in such a manner as to face the regions which do not make contact with the negative electrodes 107 within the main surfaces of the negative electricity collecting plates 109 to which the negative electrodes 107 are connected. Accordingly, the electrolytic solution reservoir 104 is capable of being arranged so as to be close to the portions of the separator 110 which are sandwiched between the positive electrodes 106 and the negative electrodes 107. Therefore, even in the case where the positive electrodes 106 and the negative electrodes 107 absorb the electrolytic solution as a result of expansion at the time of charging, and the electrolytic solution becomes insufficient in the separator 110 which is sandwiched between the positive electrodes 106 and the negative electrodes 107, the electrolytic solution can be quickly supplied to the separator 110 by the electrolytic solution reservoir 104. In addition, even in the case where the positive electrodes 106 and the negative electrodes 107 discharge the electrolytic solution as a result of contraction at the time of discharge, and the electrolytic solution overflows from the separator 110 which is sandwiched between the positive electrodes 106 and the negative electrodes 107, the electrolytic solution reservoir 104 can absorb the electrolytic solution quickly from the separator 110 and hold this. Accordingly, expansion/contraction of the positive electrodes 106 and the negative electrodes 107 is allowed at the time of charging and discharge, while the electrolytic solution with which the separator 110 is impregnated can be kept at a constant amount. As a result of this, the increase in the electric resistance of the separator 110 and leaking of the electrolytic solution to the outside can be avoided while increasing the capacitance. Furthermore, the electrolytic solution reservoir 104 is provided without being sandwiched between the positive electrodes 106 and the negative electrodes 107, and therefore, no unnecessary member intervenes between the positive electrodes 106 and the negative electrodes 107. Accordingly, the performance does not deteriorate as a result of the position of the electrolytic solution reservoir 104 in the arrangement.

It was confirmed that the electric double layer capacitor according to the third embodiment exhibits stable operation within a drop of 5% in the capacitance when 5000 cycles of charging and discharge are carried out, where one cycle takes 10 minutes.

In addition, in the third embodiment, the electrolytic solution reservoir 104 is placed between the positive electricity collecting plates 108 or between the negative electricity collecting plates 109, and therefore, the spaces between the electricity collecting plates can be used effectively. Accordingly, the electrolytic solution reservoir 104 can be appropriately placed without increasing the outer size of the present electric double layer capacitor.

In addition, the separator 110 according to the third embodiment has a single member (separators 110a or 110b) which is folded so as to be placed between the positive electrode 106 and the negative electrode 107 in each of a plurality of unit cells 150, and therefore, the separator 110 which passes through a plurality of unit cells 150 can be assembled at low cost. In addition, effects are obtained, such that the arrangement of the electrolytic solution reservoir 104 becomes easy.

In addition, in the third embodiment, the electrolytic solution reservoir 104 is placed in the mountain fold portions 260 of the separator 110a and the valley fold portions 250 of the separator 110b so as to make contact with these, that is, arranged in the folded portions which are placed so as to be shared by two adjacent unit cells 150 and make contact with these, and therefore, the electrolytic solution reservoir 104 can be easily arranged so as to correspond to these two respective unit cells 150.

Fourth Embodiment

Figure 16:
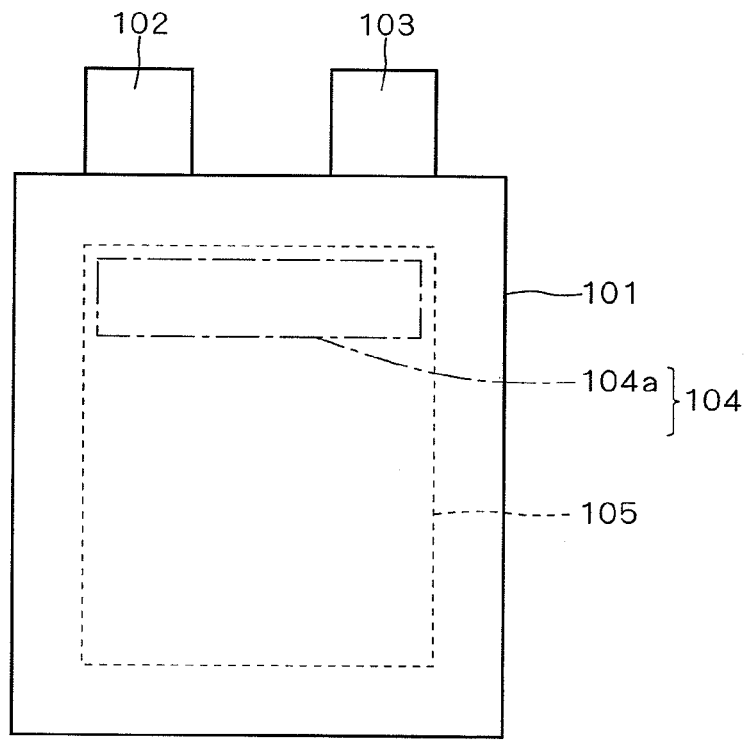
FIG. 16 is a front view showing the structure of an electric double layer capacitor according to a fourth embodiment of the present invention.

FIG. 16 is a front view showing the structure of an electric double layer capacitor according to a fourth embodiment of the present invention. As shown in FIG. 16, in the electric double layer capacitor according to the fourth embodiment, a positive electrode terminal 102 and a negative electrode terminal 103 protrude from the same side of an exterior case 101.

Figure 17:
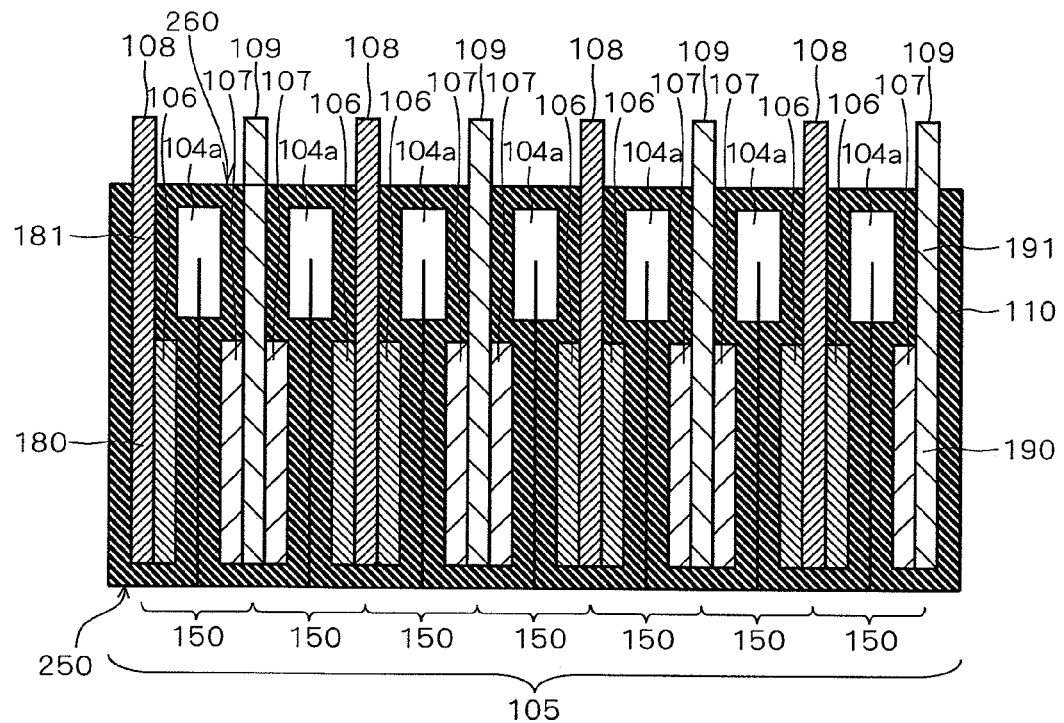
FIG. 17 is a sectional view showing the structure of the electric double layer capacitor according to the fourth embodiment of the present invention.

FIG. 17 is a sectional view showing the structure of the electrolytic solution reservoir 104 and a cell portion 105 in a state where the two are contained within the exterior case 101. As shown in FIG. 17, a positive electrode non-contacting portion 181 extends upward from a positive electrode contacting portion 180 in a positive electricity collecting plate 108, in the same manner as in the third embodiment. In addition, the positive electrode non-contacting portion 181 is connected to the positive electrode terminal 102. Meanwhile, a negative electrode non-contacting portion 191 extends upward from a negative contacting portion 190 in a negative electricity collecting plate 109, unlike in the third embodiment. In addition, the negative electrode non-contacting portion 191 is connected to the negative electrode terminal 103. The positive electrode terminal 102 and the negative electrode terminal 103 are sealed with sealing portions, not shown, which are provided on the upper surface of the exterior case 101 and protrude to the outside from the upper surface side of the exterior case 101, as shown in FIG. 16.

Though the separator 110 according to the third embodiment is formed of two separators 110a and 110b, that is, two members, the separator 110 according to the fourth embodiment is formed of a single member. The separator 110 is placed between the positive electrode 106 and the negative electrode 107 in each unit cell 150 by bending a single member. In addition, the separator 110 is provided so as to cover the larger part of the surface of the positive electrodes 106 and the positive electricity collecting plates 108, as well as the negative electrodes 107 and the negative electricity collecting plates 109, and make contact with these.

The electrolytic solution reservoirs 104a respectively make contact with the separator 110. The electrolytic solution reservoir 104a is placed so as to face the region that does not make contact with the positive electrode 106 in the main surface of the positive electricity collecting plate 108 to which the positive electrode 106 is connected and the region that does not make contact with the negative electrode 107 in the main surface of the negative electricity collecting plate 109 to which the negative electrode 109 is connected, in each unit cell 150. That is, in each unit cell 150, the electrolytic solution reservoir 104a is sandwiched between the positive electrode non-contacting portion 181 and the negative electrode non-contacting portion 191, and is placed so as to face the main surface of the positive electrode non-contacting portion 181 that is located on the positive electrode 106 side and the main surface of the negative electrode non-contacting portion 191 that is located on the negative electrode 107 side. In addition, the electrolytic solution reservoir 104a is not sandwiched between the positive electrode 106 and the negative electrode 107 in each unit cell 150.

Figure 18:
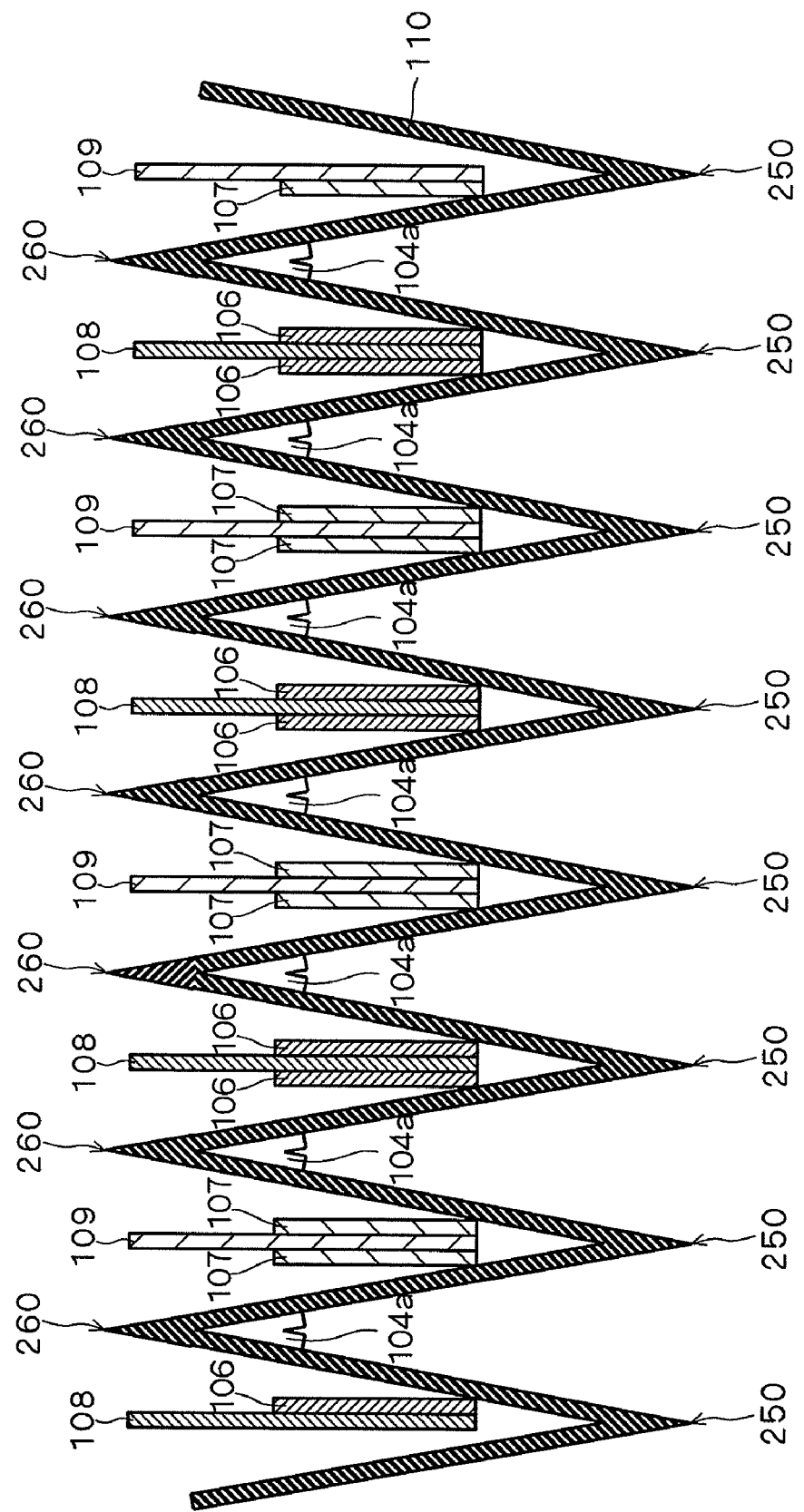
FIG. 18 is a sectional view showing the structure of the electric double layer capacitor according to the fourth embodiment of the present invention.
Figure 19:
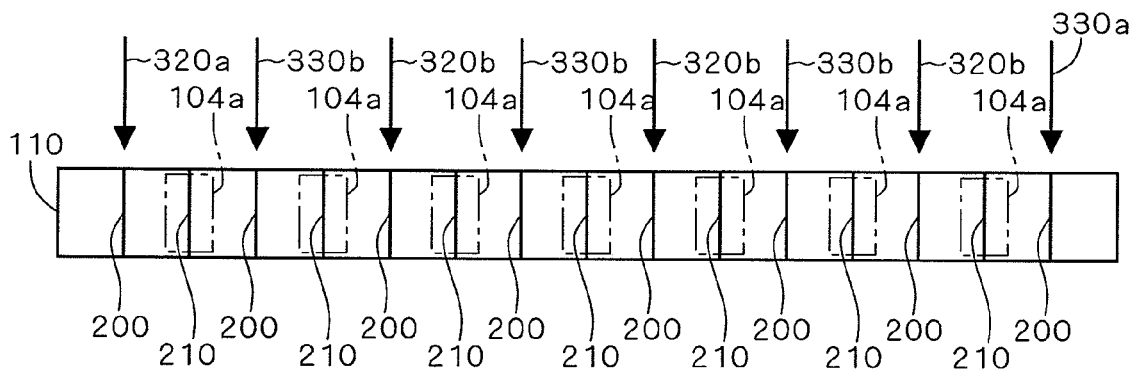
FIG. 19 is a plan view showing the structure of a separator according to the fourth embodiment of the present invention.

FIG. 18 is a sectional view showing the structure of the electrolytic solution reservoir 104 and the cell portion 105 in a state before the two are contained within the exterior case 101, and FIG. 19 is a plan view showing the structure of the separator 110 shown in FIG. 18 as viewed in the direction of arrow B. As shown in FIG. 19, valley folds 200 and mountain folds 210 are alternately provided at constant intervals in the separator 110, and as a result, the separator 110 forms a bellow. The separator 110 can be easily formed in a manner which is not greatly different from that of the third embodiment, and can be manufactured at low cost. As shown in FIG. 18, the positive electrodes 106 and the positive electricity collecting plates 108, as well as the negative electrodes 107 and the negative electricity collecting plates 109, are placed in the valley fold portions 250 that have been formed in the separator 110, while the electrolytic solution reservoirs 104a are folded and attached to the lower surface side of the mountain fold portions 260 of the separator 110.

When the electrolytic solution reservoir 104 and the cell portion 105 are contained within the exterior case 101, the positive electrodes 106 and the positive electricity collecting plates 108, as well as the negative electrodes 107 and the negative electricity collecting plates 109, are inserted into the valley fold portions 250 of the separator 110 to which the electrolytic solution reservoirs 104a are attached, and then, the separator 110 is folded in such a manner that the separator 110, the positive electrodes 106, and the positive electricity collecting plates 108, the negative electrodes 107 and the negative electricity collecting plates 109 are made to adhere to each other, and these elements are contained within the exterior case 101.

As described above, when the electrolytic solution reservoir 104 and the cell portion 105 are contained within the exterior case 101, as shown in FIG. 17, the mountain fold portion 260 of the separator 110 is placed between the positive electricity collecting plate 108 and the negative electricity collecting plate 109 in each unit cell, and the electrolytic solution reservoir 104a is placed in the mountain fold portion 260 so as to make contact with this.

Here, arrow 320a in FIG. 19 shows the point at which a positive electricity collecting plate 108 where a positive electrode 106 is provided only on one side is inserted, and arrows 320b show the point at which positive electricity collecting plates 108 where positive electrodes 106 are provided on the two sides are inserted. In addition, arrow 330a in FIG. 19 shows the point at which a negative electricity collecting plate 109 where a negative electrode 107 is provided only on one side is inserted, and arrows 330b show the point at which negative electricity collecting plates 109 where negative electrodes 107 are provided on the two sides are inserted.

In the electric double layer capacitor according to the fourth embodiment having the configuration, the electrolytic solution reservoirs 104a are capable of being placed close to the portions of the separator 110 which are sandwiched between the positive electrodes 106 and the negative electrodes 107, in the same manner as in the third embodiment, and therefore, expansion/contraction of the positive electrodes 106 and the negative electrodes 107 is allowed at the time of charging and discharge, while the electrolytic solution with which the separator 110 is impregnated can be kept at a constant amount. As a result of this, the increase in the electric resistance of the separator 110 and leaking of the electrolytic solution to the outside can be avoided while increasing the capacitance. Furthermore, the electrolytic solution reservoir 104 is provided without being sandwiched between the positive electrodes 106 and the negative electrodes 107, and therefore, no unnecessary member intervenes between the positive electrodes 106 and the negative electrodes 107, and accordingly, the performance does not deteriorate as a result of the position of the electrolytic solution reservoir 104 in the arrangement.

In addition, the electrolytic solution reservoir 104 according to the fourth embodiment is placed between the positive electricity collecting plates 108 and the negative electricity collecting plates 109, and therefore, the spaces between the positive electricity collecting plates 108 and the negative electricity collecting plates 109 can be used effectively. Accordingly, the electrolytic solution reservoir 104 can be appropriately placed without increasing the outer size of the present electric double layer capacitor.

Fifth Embodiment

Figure 20:
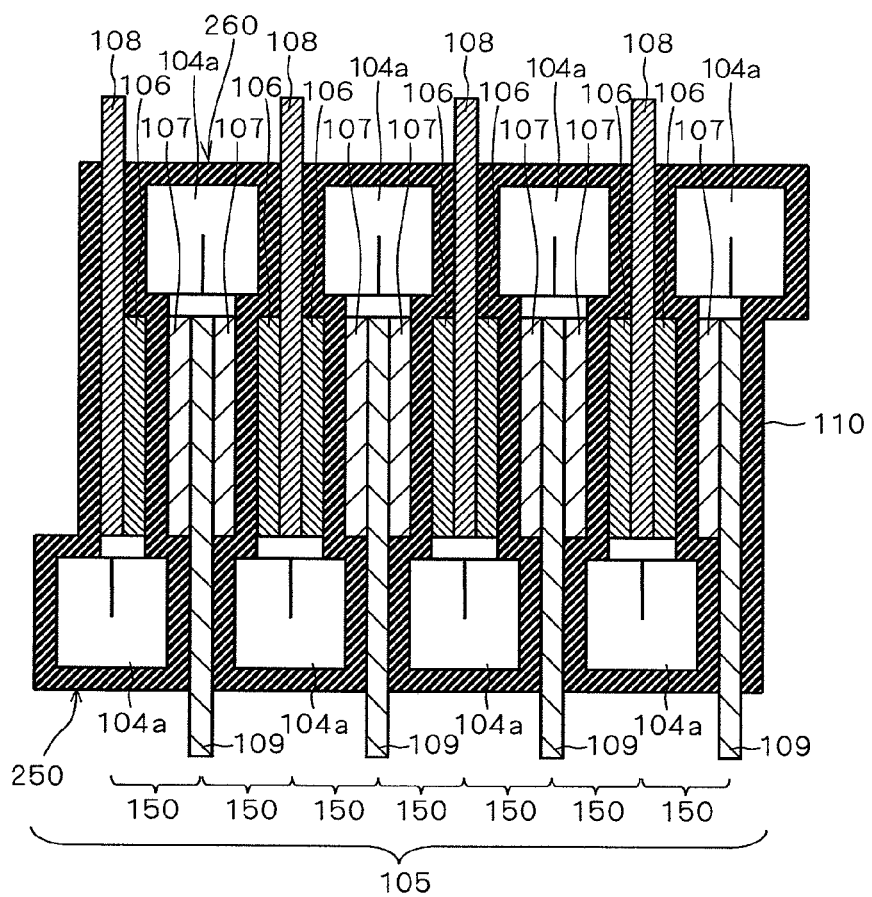
FIG. 20 is a sectional view showing the structure of an electric double layer capacitor according to a fifth embodiment of the present invention.

FIG. 20 is a sectional view showing the structure of an electric double layer capacitor according to a fifth embodiment of the present invention. The electric double layer capacitor according to the fifth embodiment is obtained by forming the separator 110 of one member in the electric double layer capacitor according to the third embodiment. FIG. 20 shows only the electrolytic solution reservoir 104 and the cell portion 105 from among the elements that form the present electric double layer capacitor.

As shown in FIG. 20, the separator 110 is placed between the positive electrode 106 and the negative electrode 107 in each unit cell 150 by bending a single member. In addition, the separator 110 is provided so as to cover and make contact with the larger part of the surface portions of the positive electrodes 106 and the positive electricity collecting plates 108 as well as the negative electrodes 107 and the negative electricity collecting plates 109.

Figure 21:
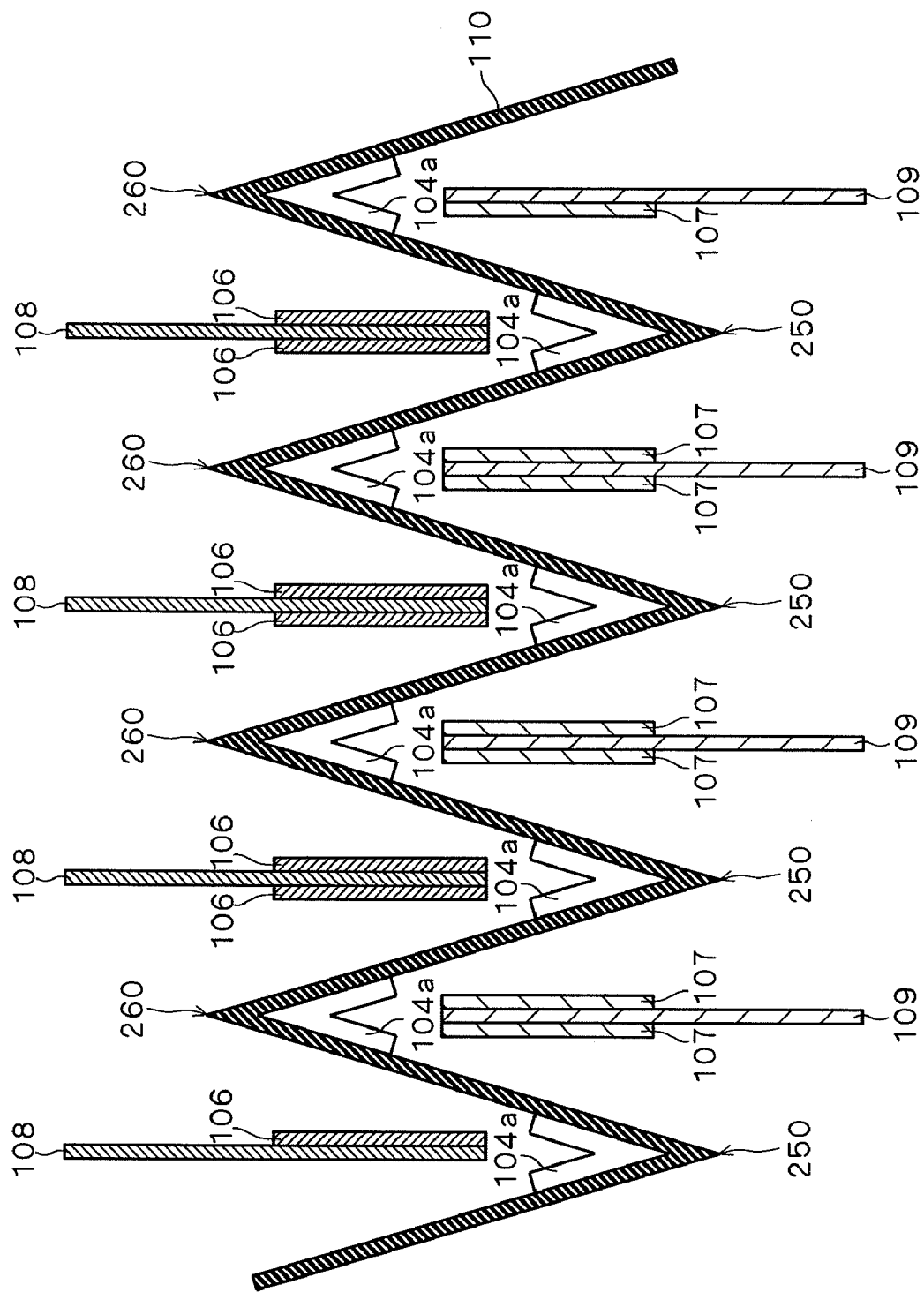
FIG. 21 is a sectional view showing the structure of the electric double layer capacitor according to the fifth embodiment of the present invention.

FIG. 21 is a sectional view showing the structure of an electrolytic solution reservoir 104 and a cell portion 105 in a state before being contained within an exterior case 101. As shown in FIG. 21, in the separator 110, electrolytic solution reservoirs 104a are folded and attached to the upper surface side of valley fold portions 250, and the positive electrodes 106 and the positive electricity collecting plates 108 are placed in the valley fold portions 250. In addition, electrolytic solution reservoirs 104a are folded and attached to the lower surface side of mountain fold portions 260, and the negative electrodes 107 and the negative electricity collecting plates 109 are placed in the mountain fold portions 260.

When the electrolytic solution reservoir 104 and the cell portion 105 are contained within the exterior case 101, the positive electrodes 106 and the positive electricity collecting plates 108 are inserted in the valley fold portions 250 of the separator 110 to which the electrolytic solution reservoirs 104a are attached, and the negative electrodes 107 and the negative electricity collecting plates 109 are inserted in the mountain fold portions 260 of the separator 110 to which the electrolytic solution reservoirs 104a are attached, and then, the separator 110 is folded so that the separator 110, and the positive electrodes 106, the positive electricity collecting plates 108, the negative electrodes 107 and the negative electricity collecting plates 109 are made to closely adhere to each other, and then, these elements are contained within the exterior case 101. As a result of this, as shown in FIG. 20, the mountain fold portions 260 of the separator 110 are placed so as to be shared by two unit cells 150 between two positive electricity collecting plates 108. In addition, the valley fold portions 250 of the separator 110 are placed so as to be shared by two unit cells 150 between two negative electricity collecting plates 109. In addition, the distance between the positive electrode 106 and the negative electrode 107 becomes to have the same value as the thickness of the separator 110 in each unit cell 150.

Here, in the electric double layer capacitor according to the third embodiment, as shown in FIG. 9, the separator 110a and the separator 110b are layered on each other, and therefore, the distance between the positive electrode 106 and the negative electrode 107 becomes the sum value of the thickness of the separator 110a and the thickness of the separator 110b in each unit cell 150. That is, the portions between the positive electrodes 106 and the negative electrodes 107 in the separator 110 have a double layer structure.

Meanwhile, in the electric double layer capacitor according to the fifth embodiment, the distance between the positive electrode 106 and the negative electrode 107 has the same value as the thickness of the separator 110 in each unit cell 150, and therefore, the portions between the positive electrodes 106 and the negative electrodes 107 in the separator 110 have a single layer structure. Accordingly, the distance between the positive electrodes 106 and the negative electrodes 107 is short in comparison with the third embodiment, and a risk of electric short circuiting between the positive electrodes 106 and the negative electrodes 107 via the separator 110 increases due to the electrode material (free activated carbon particles, grown metal dendrite or the like). However, the separator 110 is formed of a single member, and therefore, a reduction in the cost of the materials that form the present electric double layer capacitor can be achieved.

Sixth Embodiment

Figure 22:
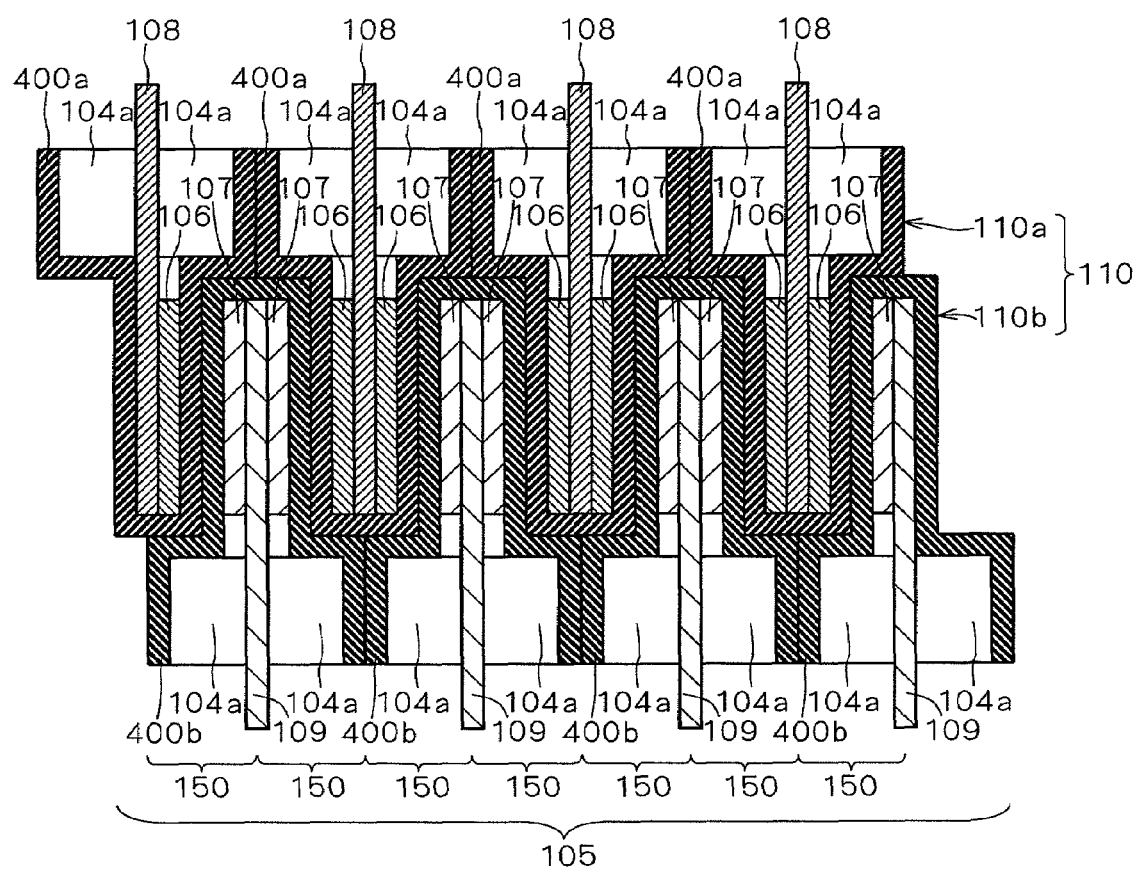
FIG. 22 is a sectional view showing the structure of an electric double layer capacitor according to a sixth embodiment of the present invention.

FIG. 22 is a sectional view showing the structure of an electric double layer capacitor according to a sixth embodiment of the present invention. The electric double layer capacitor according to the sixth embodiment is obtained, basically, by dividing each of the separators 110a and 110b into multiple pieces in the electric double layer capacitor according to the third embodiment. FIG. 22 shows only the electrolytic solution reservoir 104 and the cell portion 105 from among the elements which form the present electric double layer capacitor.

Figure 23:
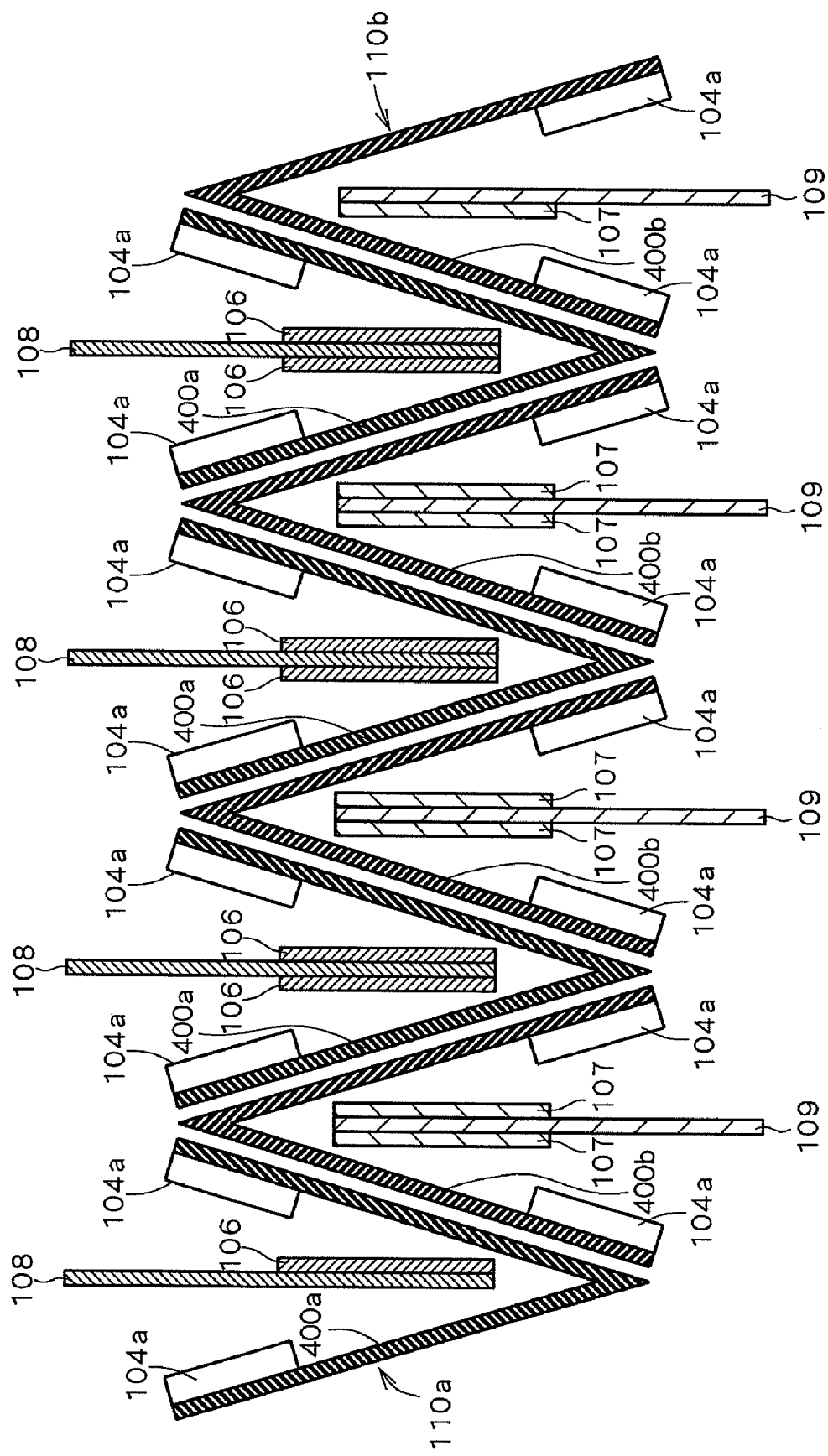
FIG. 23 is a sectional view showing the structure of the electric double layer capacitor according to the sixth embodiment of the present invention.

FIG. 23 is a sectional view showing the structure of the electrolytic solution reservoir and the cell portion 105 in a state before being contained within the exterior case 101. As shown in FIG. 23, the separator 110a is divided at the mountain fold portions 260. As a result of this, the separator 110a is formed of multiple members 400a which are folded in a V shape. In addition, the positive electrodes 106 and the positive electricity collecting plates 108 get caught in the members 400a. Meanwhile, the separator 110b is divided at the valley fold portions 250. As a result of this, the separator 110b is formed of multiple members 400b which are folded in an inverted V shape. In addition, the negative electrodes 107 and the negative electricity collecting plates 109 get caught in the members 400b.

Half of the multiple electrolytic solution reservoirs 104a is placed on the two end portions of the interior main surface of each member 400a. The remaining half of the multiple electrolytic solution reservoirs 104a is placed on the two end portions of the interior main surface of each member 400b.

When the electrolytic solution reservoir 104 and the cell portion 110 are contained within the exterior case 101, members 400a, to which electrolytic solution reservoirs 104a are attached, and members 400b, to which electrolytic solution reservoirs 104a are attached, are alternately aligned, positive electrodes 106 and positive electricity collecting plates 108 are inserted into the members 400a and negative electrodes 107 and negative electricity collecting plates 109 are inserted into members 400b, and after that, the members 400a and 400b are folded so that the positive electrodes 106 and the positive electricity collecting plates 108 are sandwiched between the members 400a, and the negative electrodes 107 and the negative electricity collecting plates 109 are sandwiched between the members 400b, respectively, and thus, these elements are contained within the exterior case 101. As a result of this, as shown in FIG. 22, half of the multiple electrolytic solution reservoirs 104a are sandwiched between the separators 110a and the positive electricity collecting plates 108, and the remaining half thereof are sandwiched between the separators 110b and the negative electricity collecting plates 109.

As described above, the separators 110a and 110b are respectively formed of multiple members, and thereby, the plurality of unit cells 150 can be easily increased or decreased even though the productivity becomes inferior due to the failure of the formation of a single member, and an advantage is obtained where it becomes possible to handle these members in a state where the positive electrodes 106 and the negative electrodes 107 are sandwiched between the separators.

Seventh Embodiment

Figure 24:
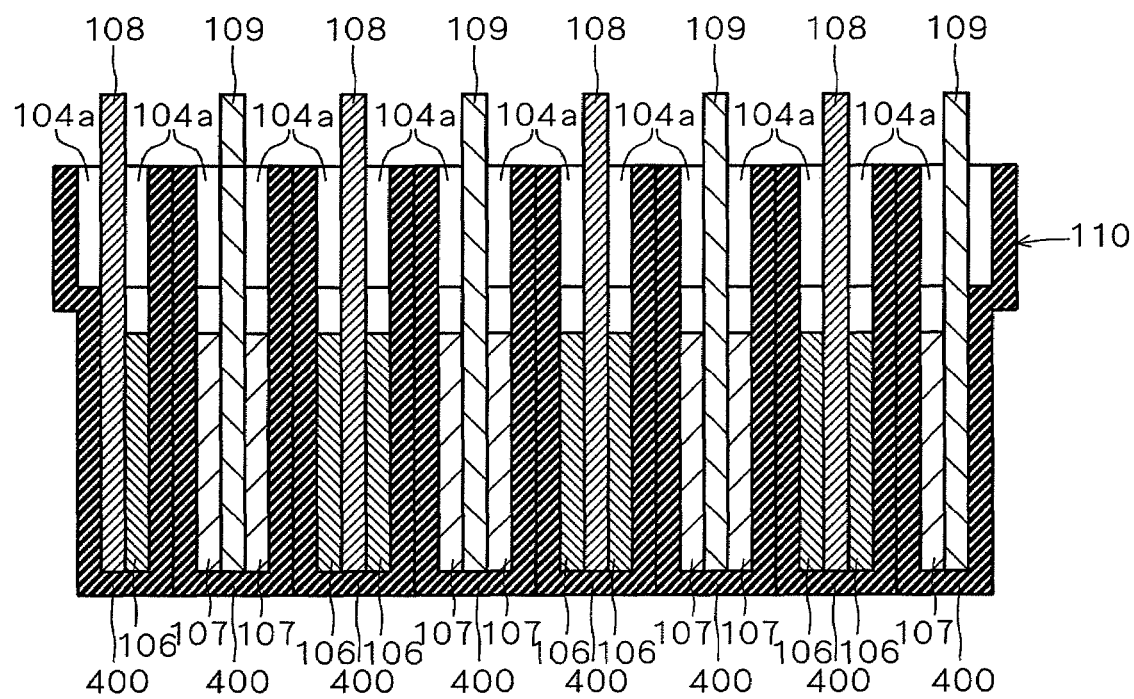
FIG. 24 is a sectional view showing the structure of an electric double layer capacitor according to a seventh embodiment of the present invention.

FIG. 24 is a sectional view showing the structure of an electric double layer capacitor according to a seventh embodiment of the present invention. The electric double layer capacitor according to the seventh embodiment is obtained, basically, by dividing the separator 110 into multiple pieces in the electric double layer capacitor according to the fourth embodiment. FIG. 24 shows only the electrolytic solution reservoir 104 and the cell portion 105 from among the elements that form the present electric double layer capacitor.

Figure 25:
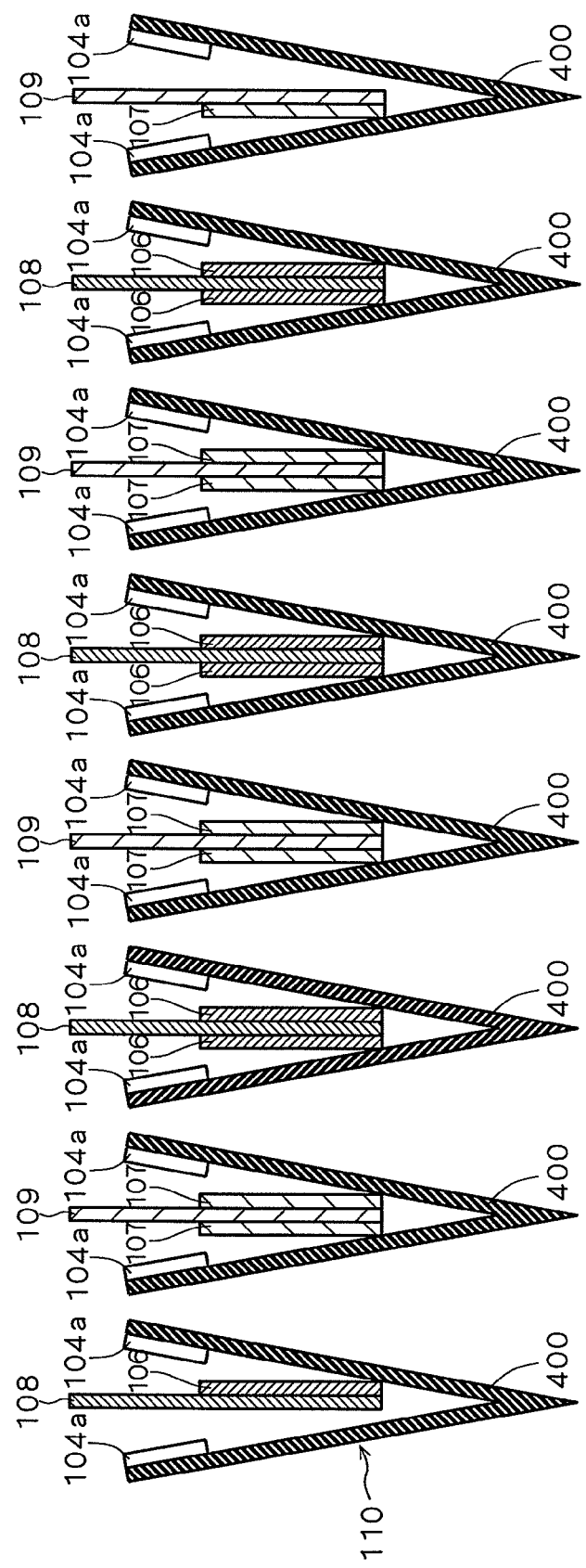
FIG. 25 is a sectional view showing the structure of the electric double layer capacitor according to the seventh embodiment of the present invention.

FIG. 25 is a sectional view showing the structure of the electrolytic solution reservoir 104 and the cell portion 105 in a state before being contained within the exterior case 101. As shown in FIG. 25, the separator 110 is divided at the mountain fold portions 260. As a result of this, the separator 110 is formed of multiple members 400 which are folded in a V shape. In addition, the positive electrodes 106 and the positive electricity collecting plates 108 get caught in the members 400 and the negative electrodes 107 and the negative electricity collecting plates 109 get caught in the members 400. The electrolytic solution reservoirs 104a are placed on the two upper end portions of the interior main surface of each member 400.

When the electrolytic solution reservoir 104 and the cell portion 105 are contained within the exterior case 101, multiple members 400, to which electrolytic solution reservoirs 104a are attached, are aligned, the positive electrodes 106 which are connected to the positive electricity collecting plates 108 and the negative electrodes 107 which are connected to the negative electricity collecting plates 109 are alternately inserted into these multiple members 400, and after that, the members 400 are folded so that the positive electrodes 106 and the positive electricity collecting plate 108, as well as the negative electrodes 107 and the negative electricity collecting plates 109 get caught in the members 400, and thus, these elements are contained within the exterior case 101. As a result of this, as shown in FIG. 24, half of the multiple electrolytic solution reservoirs 104a are sandwiched between the separator 110 and the positive electricity collecting plates 108, and the remaining half thereof is sandwiched between the separator 110 and the negative electricity collecting plates 109.

As described above, the separator 110 is formed of multiple members, and thereby, the plurality of unit cells 150 can be easily increased or decreased even though the productivity becomes inferior due to the failure of the formation of a single member, and an advantage is obtained where it becomes possible to handle these members in a state where the positive electrodes 106 and the negative electrodes 107 are sandwiched between the separators.

Eighth Embodiment

Figure 26:
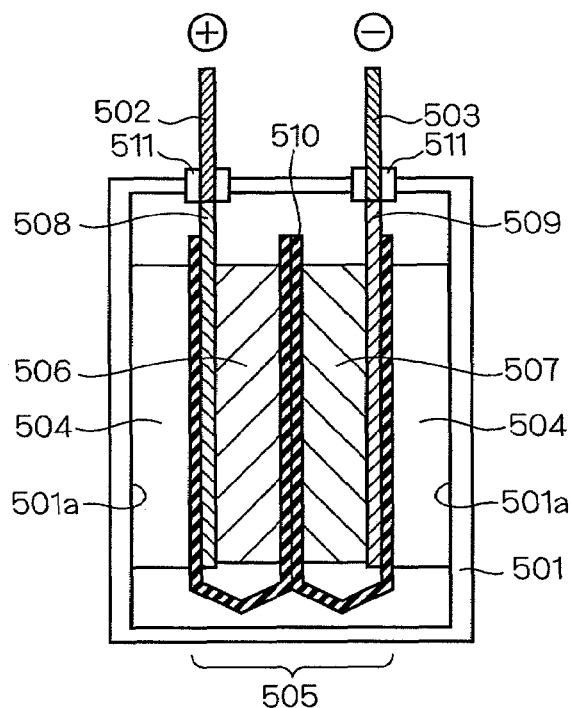
FIG. 26 is a sectional view showing the structure of an electric double layer capacitor according to an eighth embodiment of the present invention.
Figure 27:
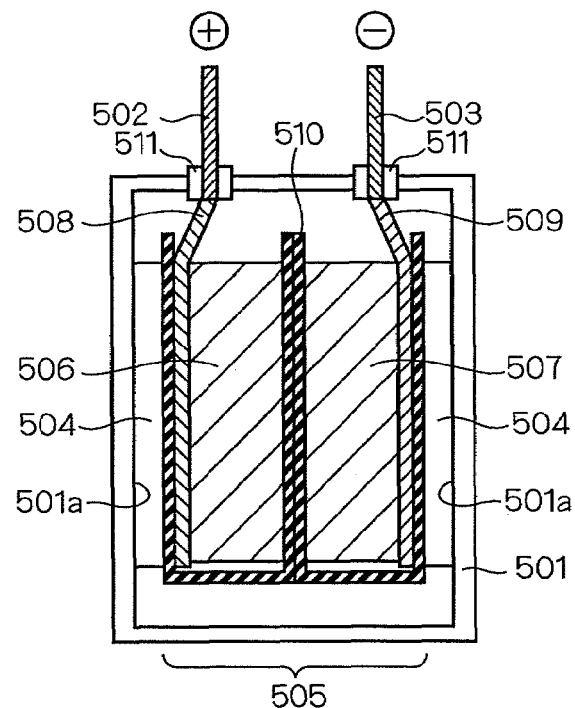
FIG. 27 is a sectional view showing the structure of the electric double layer capacitor according to the eighth embodiment of the present invention.

FIGS. 26 and 27 are sectional views showing the structure of an electric double layer capacitor according to an eighth embodiment of the present invention. FIG. 26 shows the structure of the present electric double layer capacitor when fully discharged, and FIG. 27 shows the structure of the present electric double layer capacitor when fully charged. As shown in FIGS. 26 and 27, the electric double layer capacitor according to the eighth embodiment is provided with an exterior case 501, an electrolytic solution reservoir 504 and a cell portion 505, which are contained within this exterior case 501, positive electrode terminal 502 and negative electrode terminal 503.

The cell portion 505 is provided with a positive electrode 506 and a negative electrode 507, which face each other with a porous separator 510 in between, as well as a positive electricity collecting plate 508 and a negative electricity collecting plate 509, which are connected to the positive electrode 506 and the negative electrode 507, respectively, from the outside. The positive electrode 506, the negative electrode 507 and the separator 510 are impregnated with an electrolytic solution.

As for the material of the positive electrode 506 and the negative electrode 507, the same material for the positive electrode 106 and the negative electrode 107 can be used. The form of the main surface of the positive electrode 506 and the negative electrode 507, respectively, is, for example, a square of 10 cm×10 cm of which the area is 100 cm$^2$. Hereinafter, the positive electrode 506 and the negative electrode 507 are generally and simply referred to as "electrode."

The positive electrode 506 is formed on the positive electricity collecting plate 508, and the negative electrode 507 is formed on the negative electricity collecting plate 509. The positive electricity collecting plate 508 is formed of, for example, aluminum foil and is connected to the positive electrode terminal 502. The negative electricity collecting plate 509 is formed of, for example, aluminum foil or copper foil and is connected to the negative electrode terminal 503. The positive electrode terminal 502 and the negative electrode terminal 503 are sealed with sealing portions 511, which are provided on the upper surface the exterior case 501 and protrude to the outside from the upper surface side of the exterior case 501.

The separator 510 is provided between the positive electrode 506 and the negative electrode 507 and covers the larger part of and makes contact with the main surface of the positive electricity collecting plate 508 on the side opposite to the positive electrode 506. Furthermore, the separator 510 is provided so as to cover the larger part of and make contact with the main surface of the negative electricity collecting plate 509 on the side opposite to the negative electrode 507. In addition, the separator 510 is provided so as to cover the bottom of the positive electrode 506, the positive electricity collecting plate 508, the negative electrode 507 and the negative electricity collecting plate 509. As for the material of the separator 510, the same material as that of the separators 7 and 110 can be used. The separator 510 has a thickness of approximately 20 µm to 50 µm, a porosity (void volume) of approximately 60% to 80%, and an average diameter of pores from several µm to several tens of µm.

The electrolytic solution reservoir 504 is formed of a porous material which has cushioning properties and is capable of being impregnated with an electrolytic solution, and is provided so as to make contact with the separator 510. The electrolytic solution reservoir 504 according to the eighth embodiment is placed between the inner side 501a of the exterior case 501 and the side of the cell portion 505 which is the main surface thereof so as to make contact with these. Concretely, the electrolytic solution reservoir 504 is formed between the side of the separator 510 that is formed on the main surface of the positive electricity collecting plate 508 on the side opposite to the positive electrode 506 and the inner side 501a of the exterior case 501 so as to make contact with these, and is formed between the side of the separator 510 that is formed on the main surface of the negative electricity collecting plate 509 on the side opposite to the negative electrode 507 and the inner side 501a of the exterior case 501 so as to make contact with these. The electrolytic solution reservoir 504 can be formed of a variety of materials so as to have a variety of structures, as long as it is stable in the used electrolyte and under the electrochemical potential and temperature conditions for use. The form of the main surface of the electrolytic solution reservoir 504 is, for example, a square of 10 cm×10 cm, which is the same as the form of the main surface of the positive electrode 506 and the negative electrode 507, and of which the area is 100 cm$^2$.

As the electrolyte and the solvent, the same as those in the first embodiment can be used. As for the material of the exterior case 501, the same material as that of the exterior cases 1 and 101 can be used. A release valve, not shown, is provided to the exterior case 501. A small penetrating hole is provided in the release valve, and though this penetrating hole is usually closed with a valve, when the internal pressure of the exterior case 501 increases, the valve opens and the penetrating hole opens, and thereby, the gas within the exterior case 501 is released to the outside.

In the electric double layer capacitor according to the eighth embodiment which has the configuration when the positive electrode 506 and the negative electrode 507 expand at the time of charging and contract at the time of discharge, the electrolytic solution is exchanged through the portion where the electrolytic solution reservoir 504 and the separator 510 make contact with each other. At the time of charging, as shown in FIG. 27, the positive electrode 506 and the negative electrode 507 absorb the electrolytic solution so as to expand in such a manner that the electrolytic solution with which the separator 510 is impregnated moves toward the positive electrode 506 and the negative electrode 507. Thus, the electrolytic solution moves from the electrolytic solution reservoir 504 to the separator 510 via the contacting surface between the electrolytic solution reservoir 505 and the separator 510. When fully charged, the positive electrode 506 and the negative electrode 507 expand most, and the electrolytic solution reservoir 504 contracts most.

In contrast, at the time of discharge, as shown in FIG. 26, the positive electrode 506 and the negative electrode 507 discharge the electrolytic solution so as to contract, and the electrolytic solution moves toward the separator 510. Thus, the electrolytic solution moves from the separator 510 to the electrolytic solution reservoir 504 via the contacting surface between the electrolytic solution reservoir 504 and the separator 510. When fully discharged, the positive electrode 506 and the negative electrode 507 contract most, and the electrolytic solution reservoir 504 expands most.

In the eighth embodiment, the main surface of the electrolytic solution reservoir 504 and the main surface of the separator 510 make contact with each other, and therefore, electrolytic solution can be exchanged instantaneously between the electrolytic solution reservoir 504 and the separator 510 through a large area.

Figure 28:
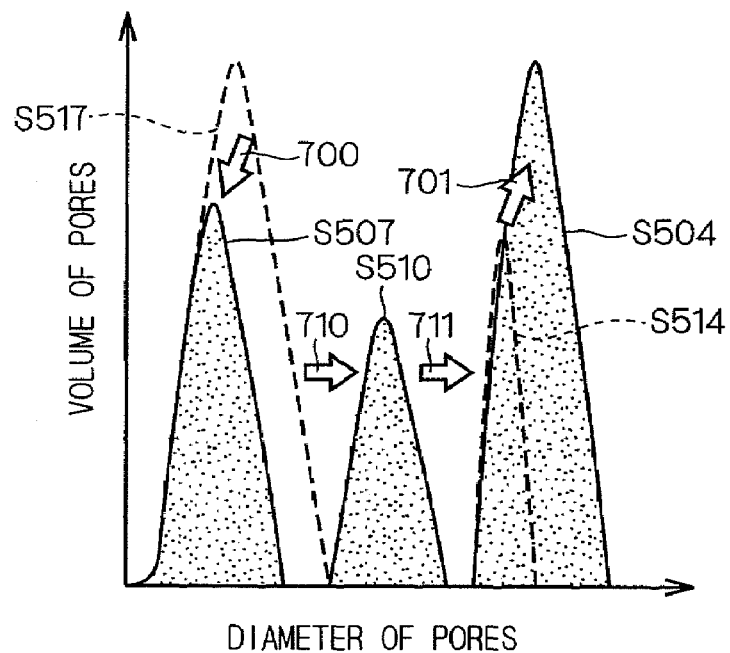
FIG. 28 is a graph showing the distribution in the diameter of the pores in the separator, the distribution in the diameter of the pores in the electrolytic solution reservoir, the distribution in the diameter of the pores in the electrodes and the occupation ratio of electrolytic solution within the pores when fully discharged.
Figure 29:
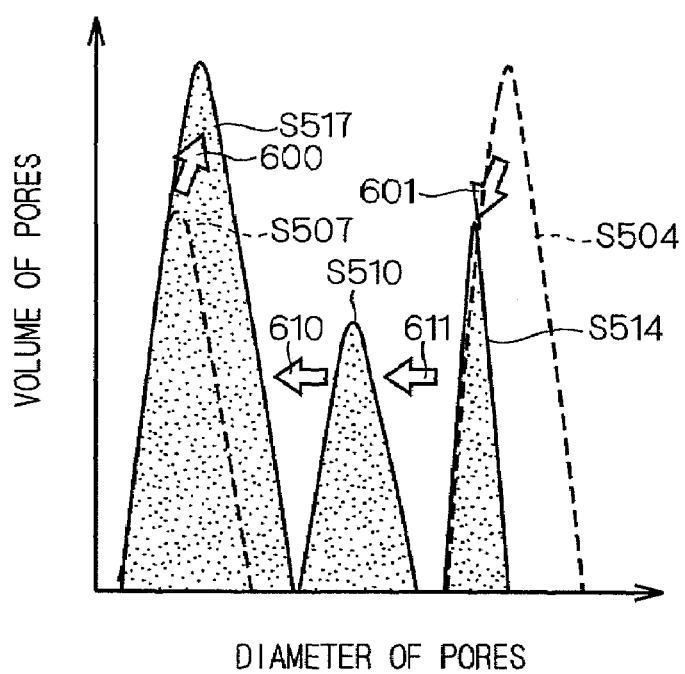
FIG. 29 is a graph showing the distribution in the diameter of the pores in the separator, the distribution in the diameter of the pores in the electrolytic solution reservoir, the distribution in the diameter of the pores in the electrodes and the occupation ratio of electrolytic solution within the pores when fully charged.

FIG. 28 is a graph showing the distribution in the diameter of the pores in the separator 510 (S510), the distribution in the diameter of the pores in the electrolytic solution reservoir 504 (S504), the distribution in the diameter of the pores in the electrodes (S507) and the occupation ratio of electrolytic solution when fully discharged. In addition, FIG. 29 is a graph showing the distribution in the diameter of the pores in the separator 510 (S510), the distribution in the diameter of the pores in the electrolytic solution reservoir 504 (S514), the distribution in the diameter of the pores in the electrodes (S517) and the occupation ratio of electrolytic solution when fully charged. In FIGS. 28 and 29, the occupation ratio of electrolytic solution is shown by hatching.

As shown in FIGS. 28 and 29, the average diameter of the pores in the electrolytic solution reservoir 504 is greater than the average diameter of the pores in the electrodes and the average diameter of the pores in the separator 510, in the same manner as in the third embodiment. Therefore, the occupation ratio of electrolytic solution within the pores in the electrodes and the separator 510 is kept high, due to the difference in the suction force of the pores. This is because in the case where the contact angle between the surface of the electrodes, the separator 510 or the electrolytic solution reservoir 504 and the electrolytic solution is smaller than 90 degrees, a force of attracting the electrolytic solution into the electrodes, the separator 510 or the electrolytic solution reservoir 504 occurs as a result of capillarity, and the smaller the diameter of the pores in these is, the stronger the force becomes. When the contact angles are the same, pores are filled with the electrolytic solution sequentially starting from the pores having smaller diameters. In addition, the average diameter of the pores in the electrodes is smaller than the average diameter of the pores in the separator 510, and therefore, the electrodes are kept in a state where they are always fully filled with electrolytic solution. In the case where the amount of electrolytic solution is smaller than the total volume of the pores in the electrodes, the electrolytic solution reservoir 504 and the separator 510, pores having a large diameter in the electrolytic solution reservoir 504 remain as regions which are not filled with electrolytic solution.

At the time of charging, when the electrolytic solution is absorbed by the carbon in the electrodes, as a result of a mechanism such as intercalation, in such a manner that the volume of the electrodes increases, as shown by arrow 600 in FIG. 29, the electrolytic solution moves from the separator 510 to the electrodes, as shown by arrow 610, in such a manner that voids are created in some pores in the separator 510. In the electric double layer capacitor according to the eighth embodiment, however, as shown by arrow 611, the electrolytic solution in pores having a large diameter in the electrolytic solution reservoir 504 moves toward the voids in the separator 510, so that these voids are filled with the electrolytic solution.

Furthermore, when the electrodes expand, the surface pressure that is applied to the electrolytic solution reservoir 504 increases, and as shown by arrow 601 in FIG. 29, the electrolytic solution reservoir 504 having cushioning properties is crushed. Thus, as shown by arrow 611, the electrolytic solution that is held by the electrolytic solution reservoir 504 is quickly released to the separator 510. Accordingly, voids that have been created in the separator 510 can be quickly filled with electrolytic solution. In addition, the expansion of the electrodes is absorbed by the electrolytic solution reservoir 504, and therefore, the expansion of the exterior case 501 can be lessened.

As described above, the electrolytic solution reservoir 504 having cushioning properties is provided, and thereby, the expansion of the electrodes is allowed, and the electrolytic solution is absorbed by the electrodes as much as allowed by the expansion, and therefore, high capacitance can be obtained.

In the example shown in FIG. 29, the occupation ratio of electrolytic solution within the pores in the separator 510 when fully charged is 100%. In this case, the electric resistance of the separator 510 does not increase at all. In the case where the occupation ratio of electrolytic solution within the pores in the separator 510 is 50% or more, however, the electrolytic solution within adjacent pores in the separator 510 is continuous, and thus, the increase in the electric resistance falls within an allowable range. The amount of electrolytic solution within the separator 510 becomes smallest when fully charged, and therefore, in the case where the occupation ratio of electrolytic solution within the pores in the separator 510 when fully charged is 50% or more, the increase in the electric resistance of the separator 510 falls within an allowable range.

Meanwhile, when the electrodes contract at the time of discharge, as shown by arrow 70 in FIG. 28, the electrolytic solution that has been discharged from the electrodes, as shown by arrow 710, moves toward the separator 510. When the occupation ratio of electrolytic solution within the pores in the separator 510 exceeds 100%, as shown by arrow 711, the electrolytic solution which cannot be contained in the separator 510 is absorbed by the electrolytic solution reservoir 504. As a result of this, a state where the electrolytic solution overflows to the outside of the exterior case 501 through the release valve can be avoided. When the electrodes contract, the surface pressure that is applied to the electrolytic solution reservoir 504 decreases, and as shown by arrow 701, the electrolytic solution reservoir 504 having cushioning properties is expanded. Thus, the electrolytic solution reservoir 504 fully absorbs the electrolytic solution overflowed from the separator 510. The amount of electrolytic solution within the separator 510 becomes greatest when fully discharged, and therefore, as shown in FIG. 28, in the case where the occupation ratio of electrolytic solution within the pores in the electrolytic solution reservoir 504 when fully discharged is 100% or less, leaking of electrolytic solution to the outside of the exterior case 501 can be prevented.

As described above, the electrolytic solution reservoir 504 may be impregnated with a predetermined amount of electrolytic solution, in such a manner that the occupation ration of the electrolytic solution within the pores in the separator 510 when fully charged becomes 50% or more, and the occupation ratio of electrolytic solution within the pores in the electrolytic solution reservoir 504 when fully discharged becomes 100% or less. As a result, the increase in the electric resistance of the separator 510 at the time of charging falls within an allowable range, while leaking of the electrolytic solution to the outside at the time of discharge can be prevented.

In an example of the eighth embodiment, as the separator 510, separator paper for electric double layer capacitors "TF40," made by Nippon Kodoshi Corporation, can be used. In addition, as the electrolytic solution reservoir 504, a porous film having a thickness of 1.5 mm obtained by layering five porous films made of polypropylene having a thickness of 0.3 mm can be used. As the porous film made of polypropylene, "MPF45AC," made by Nippon Kodoshi Corporation, for example, can be used.

TF40 is made of solvent-spun regenerated cellulose fibers having an average diameter of pores of 0.3 micrometers and a porosity of 73%. MPF45AC is made of polypropylene fibers having an average diameter of pores of 4 micrometers and a porosity of 75%. The difference in the average diameter of pores between separator 510 and the electrolytic solution reservoir 504 is approximately ten times or more, and therefore, the separator 510 having a large suction force of pores is occupied by the electrolytic solution first.

The electrolytic solution reservoir 504 having a thickness of 1.5 mm in a state where no surface pressure is applied has a thickness of 1.0 mm when a surface pressure of 2 kg/cm$^2$ is applied and a thickness of 0.7 mm under a surface pressure of 5 kg/cm$^2$. This electrolytic solution reservoir 504 has sufficient cushioning properties for the change in the surface pressure accompanying change in the thickness of the electrodes at the time of charging and discharge.

Here, though it is desirable for the average diameter of pores in the electrolytic solution reservoir 504 to be greater than the average diameter of pores in the separator 510, even in the opposite case, where the average diameter of pores in the electrolytic solution reservoir 504 is smaller than the average diameter of pores in the separator 510, the suction force of pores becomes higher in the separator 510 than in the electrolytic solution reservoir 504 when the contact angle between the electrolytic solution and the separator 510 is smaller than the contact angle between the electrolytic solution and the electrolytic solution reservoir 504, and therefore, the same effects as in the case where there is a difference in the average diameter of pores can be obtained.

In addition, even in the case where the average diameter of pores in the electrolytic solution reservoir 504 is smaller than that in the separator 510 and the contact angle between the electrolytic solution and the separator 510 is greater than the contact angle between the electrolytic solution and the electrolytic solution reservoir 504, expansion of the exterior case due to the expansion of the electrodes at the time of charging can be lessened while the separator 510 is supplied with the electrolytic solution, so that shortage of electrolytic solution can be compensated for when the electrolytic solution reservoir 504 is crushed when the electrodes expand, so that the electrolytic solution that can no longer be contained in this electrolytic solution reservoir 504 moves toward the separator 510.

In order for the contraction/expansion of the electrodes to be tolerable, it is desirable for the length of the separator 510 to be sufficient when fully discharged, as shown in FIG. 26, and it is desirable for the length of the positive electricity collecting plate 508 and the negative electricity collecting plate 509 to be sufficient when fully charged, as shown in FIG. 27. It is possible to precisely set the most desirable length for these, on the basis of the amount of change in the thickness of the electrodes at the time of charging and discharge.

As described above, in the electric double layer capacitor according to the eighth embodiment, the electrolytic solution reservoir 504 contracts when the positive electrode 506 and the negative electrode 507 expand, and therefore, even in the case where the positive electrode 506 and the negative electrode 507 absorb the electrolytic solution through expansion at the time of charging, and thus, the separator 510 that is sandwiched between the positive electrode 506 and the negative electrode 507 runs short of electrolytic solution, the electrolytic solution can be quickly supplied from the electrolytic solution reservoir 504 to the separator 510. In addition, the electrolytic solution reservoir 504 according to the eighth embodiment expands when the positive electrode 506 and the negative electrode 507 contract, and therefore, even in the case where the positive electrode 506 and the negative electrode 507 discharge the electrolytic solution as a result of contraction at the time of discharge, and thus, the electrolytic solution overflows from the separator 510 that is sandwiched between the positive electrode 506 and the negative electrode 507, the electrolytic solution reservoir 504 can quickly absorb the electrolytic solution from the separator 510 and hold it. Accordingly, the electrolytic solution with which the separator 510 is impregnated can be kept at a constant amount while allowing sufficient expansion/contraction in the positive electrode 506 and the negative electrode 507 at the time of charging and discharge. As a result of this, the capacitance can be increased while increase in the electric resistance of the separator 110 and leaking of the electrolytic solution to the outside can be prevented.

In addition, the electrolytic solution reservoir 504 having cushioning properties is placed between the inner side 501a of the exterior case 501 and the cell portion 505, and therefore, expansion of the positive electrode 506 or the negative electrode 507 can be absorbed by the electrolytic solution reservoir 504. Accordingly, expansion of the exterior case 501 caused by expansion of the positive electrode 506 or the negative electrode 507 can be lessened.

A charging and discharge test was carried out on an electric double layer capacitor according to the eighth embodiment, and as a result, it was confirmed that the thickness of the exterior case barely changed. In addition, it was confirmed that the initial value of the capacitance was three times higher in comparison with the electric double layer capacitor having activated carbon electrodes according to the conventional art. In addition, when 3000 cycles of charging and discharge, where one cycle is 10 minutes, were carried out on the present electric double layer capacitor, it was confirmed that the reduction in the capacitance was within 5% and stable operation was exhibited.

Ninth Embodiment

Figure 30:
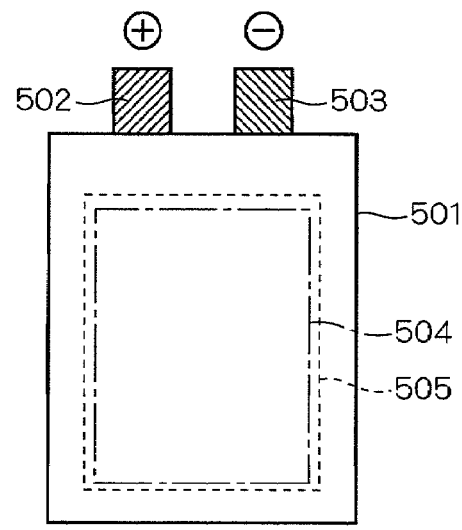
FIG. 30 is a front view showing the structure of an electric double layer capacitor according to a ninth embodiment of the present invention.
Figure 31:
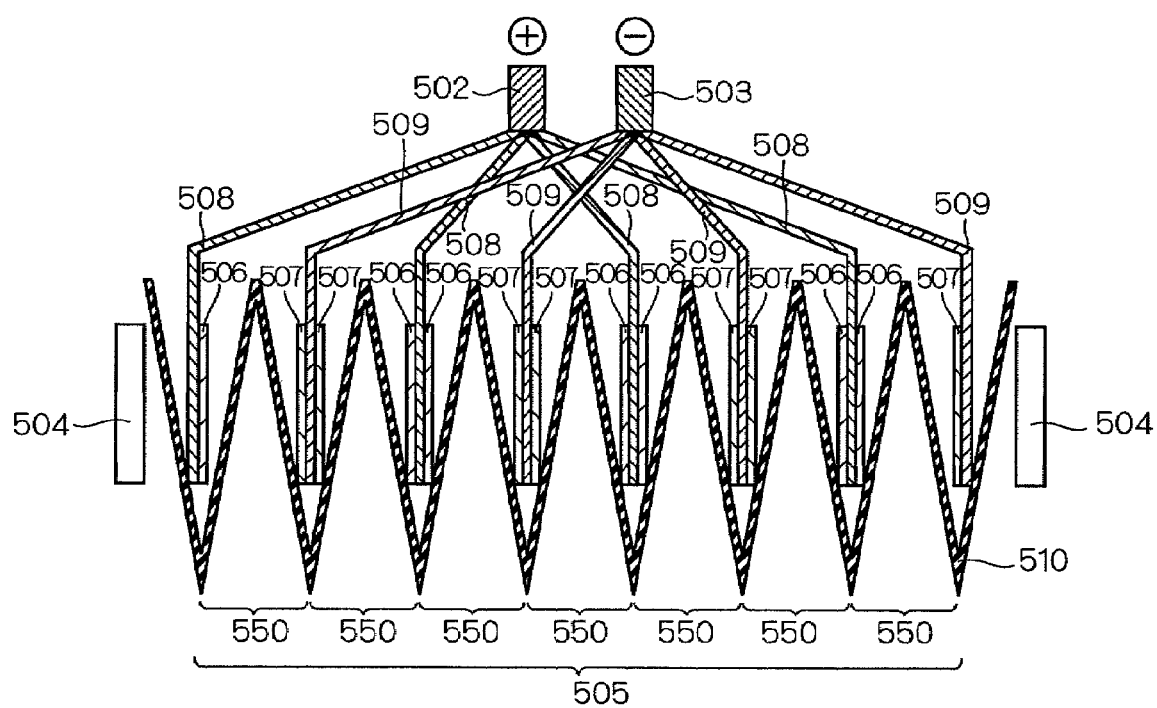
FIG. 31 is a sectional view showing the structure of the electrolytic solution reservoir and the cell portions according to the ninth embodiment of the present invention.

FIG. 30 is a front view showing the structure of an electric double layer capacitor according to a ninth embodiment of the present invention, and FIG. 31 is a sectional view showing the structure of an electrolytic solution reservoir 504 and a cell portion 505 according to the ninth embodiment. Though FIG. 31 shows respective elements located at a distance from each other, the respective elements are actually made to closely adhere to each other, as in the eighth embodiment, and are contained within an exterior case 501.

An electric double layer capacitor having only one pair of a positive electrode 506 and a negative electrode 507 is described in the eighth embodiment, while an electric double layer capacitor having a plurality of pairs of a positive electrode 506 and a negative electrode 507 is described in the ninth embodiment.

As shown in FIG. 31, the cell portion 501 according to the present embodiment 9 has a structure where a plurality of pairs of a positive electrode 506 and a negative electrode 507 which face each other with a separator 510 in between are layered on top of each other. A positive electricity collecting plate 508 and a negative electricity collecting plate 509 are connected to a positive electrode 506 and a negative electrode 507, respectively, from the outside in each pair of the positive electrode 506 and the negative electrode 507.

One unit cell 550 is formed of a pair of a positive electrode 506 and a negative electrode 507 which face each other with a separator 510 in between, and a positive electricity collecting plate 508 and a negative electricity collecting plate 509 which are connected to the positive electrode 506 and the negative electrode 507 of this pair, respectively. The cell portion 505 is provided with a plurality of unit cells 550. In the ninth embodiment, in two adjacent unit cells 550, a plurality of positive electrodes 506 and negative electrodes 507 are placed in such a manner that electrodes having the same polarity are adjacent to each other. In addition, one electricity collecting plate is placed along the border between two adjacent unit cells 550, and this one electricity collecting plate is shared by two adjacent electrodes having the same polarity. That is, one electricity collecting plate is shared by two unit cells 550.

The respective positive electricity collecting plates 508 are connected to a positive electrode terminal 502, and the respective negative electricity collecting plates 509 are connected to a negative electrode terminal 503. As a result of this, the plurality of positive electrodes 506 and the plurality of negative electrodes 507 are electrically connected in parallel. The positive electrode terminal 502 and the negative electrode terminal 503 are sealed with sealing portions, not shown, which are provided on the upper surface of the exterior case 1, in the sense same manner as in the eighth embodiment, and protrude to the outside from the upper surface side of the exterior case 501, as shown in FIG. 30.

The separator 510 is a continuous body, and is formed by folding a single member. The positive electrodes 506 which are connected to the positive electricity collecting plates 508 and the negative electrodes 507 which are connected to the negative electricity collecting plates 509 are alternately placed in the folds of the separator 510.

In the ninth embodiment, as the electrolytic solution reservoir 504, a porous fluorine-based rubber having a thickness of 2 mm is used. The electrolytic solution reservoir 504 is placed between the inner side of the exterior case 501 and the side of the cell portion 505 so as to make contact with these, in the same manner as in the eighth embodiment.

The electrolytic solution is exchanged between the electrolytic solution reservoir 504 and the separator 510, in the same manner as in the eighth embodiment, and the electrolytic solution can be exchanged between each portion of the separator 510 which is provided to the plurality of unit cells 550 and the electrolytic solution reservoir 504. Accordingly, the same effects as in the eighth embodiment can be obtained.

Here, as the material of the electrolytic solution reservoir 504, a porous silicone-based rubber may be used, in addition to the porous fluorine-based rubber, and the same effects can be obtained in this case.

Tenth Embodiment

Figure 32:
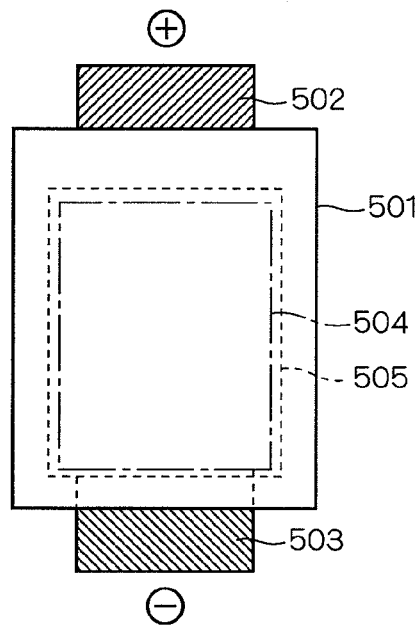
FIG. 32 is a front view showing the structure of an electric double layer capacitor according to a tenth embodiment of the present invention.
Figure 33:
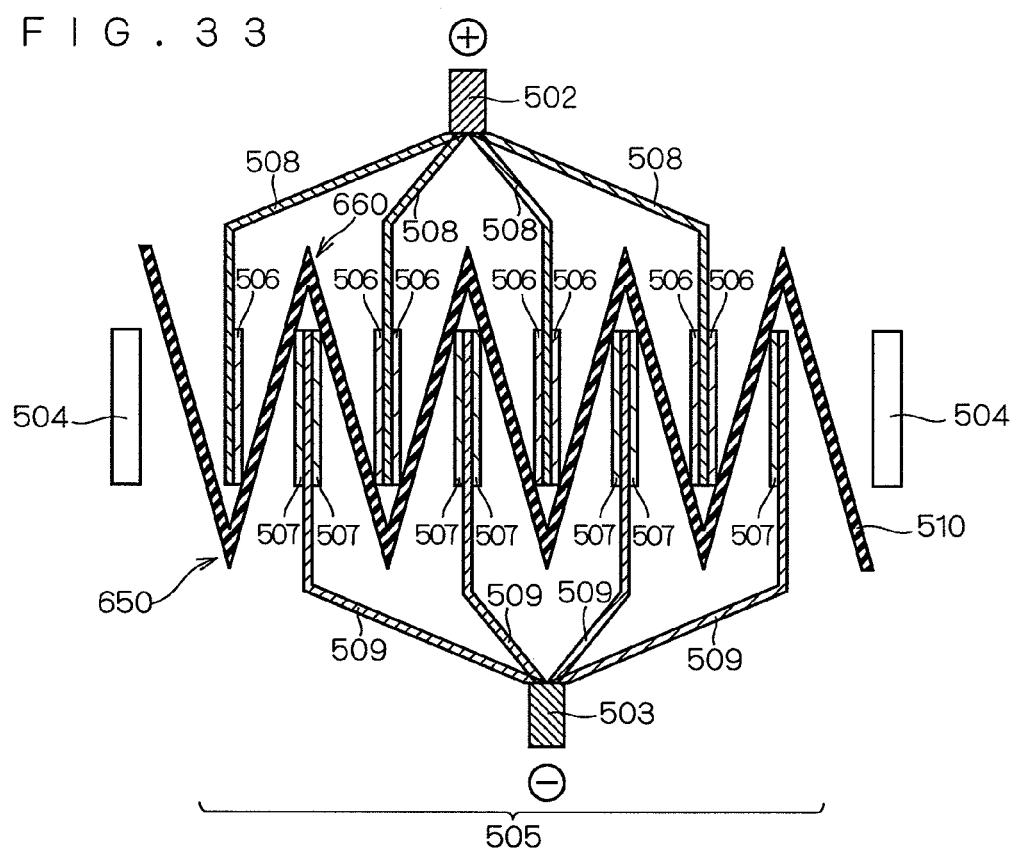
FIG. 33 is a sectional view showing the structure of the electrolytic solution reservoir and the cell portions according to the tenth embodiment of the present invention.

FIG. 32 is a front view showing the structure of an electric double layer capacitor according to a tenth embodiment of the present invention, and FIG. 33 is a sectional view showing the structure of an electrolytic solution reservoir 504 and a cell portion 505 according to the tenth embodiment. Though FIG. 33 shows respective elements located at a distance from each other, the respective elements are actually made to closely adhere to each other, as in the eighth embodiment, and are contained within an exterior case 1.

Though the positive electrode terminal 502 and the negative electrode terminal 503 protrude from the same side in the electric double layer capacitors according to the eighth and ninth embodiments, the positive electrode terminal 502 and the negative electrode terminal 503 protrude from opposite sides of the exterior case 501 in the electric double layer capacitor according to the tenth embodiment.

As shown in FIG. 33, valley folds and mountain folds are alternately created in the separator 510, in such a manner that the separator 510 has alternating valley fold portions 650 and mountain fold portions 660. Positive electrodes 506 and positive electricity collecting plates 508 get caught in the valley fold portions 650 of the separator 510, and negative electrodes 507 and negative electricity collecting plates 509 get caught in the mountain fold portions 660 of the separator 510.

The positive electrode terminal 502 is sealed with a sealing portion, not shown, which is provided on the upper surface of the exterior case 501 and protrudes to the outside from the upper surface side of the exterior case 501, as shown in FIG. 32. Meanwhile, the negative electrode terminal 503 is sealed with a sealing portion, not shown, which is provided on the bottom of the exterior case 501 and protrudes to the outside from the bottom side of the exterior case 501, as shown in FIG. 32.

In the tenth embodiment, as the electrolytic solution reservoir 504, a gel electrolytic solution having a thickness of 2 mm is used. The gel electrolytic solution is formed by heating a precursor where, for example, polyvinylidene fluoride and hexafluoropropylene are mixed in a vacuum oven, and after that, impregnating this precursor with an organic electrolytic solution (propylene carbonate) which includes an electrolyte (TEMABF4: triethylmethyl ammonium tetrafluoroborate). The gel electrolytic solution contracts when receiving intensive surface pressure, and wrings out and discharges the electrolytic solution, and reabsorbs the electrolytic solution when the received surface pressure becomes low, so that it becomes a cushion for the surface pressure and has a function of retaining the electrolytic solution.

In the case where the positive electrode terminal 502 and the negative electrode terminal 503 protrude from opposite sides of the exterior case 501, as in the tenth embodiment, the same effects as in the eighth and ninth embodiments can be obtained without any obstacles.

Eleventh Embodiment

Figure 34:
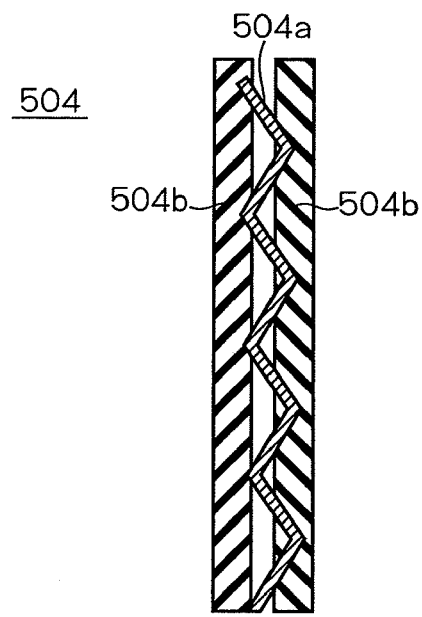
FIG. 34 is a sectional view showing the structure of an electrolytic solution reservoir according to an eleventh embodiment of the present invention.
Figure 35:
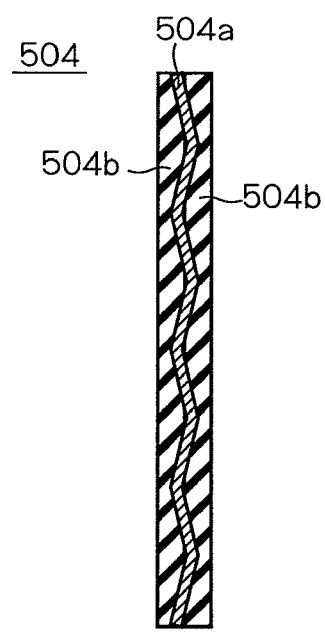
FIG. 35 is a sectional view showing the structure of the electrolytic solution reservoir according to the eleventh embodiment of the present invention.

FIGS. 34 and 35 are sectional views showing the structure of an electrolytic solution reservoir 504 according to an eleventh embodiment of the present invention. FIG. 34 shows the electrolytic solution reservoir 504 in an expanded state, and FIG. 35 shows the electrolytic solution reservoir 504 in a contracted state. The electrolytic solution reservoir 504 according to the eleventh embodiment is formed of a metal cushion plate 504a and porous bodes 504b made of carbon fibers which sandwich this metal cushion plate 504a.

As the material of the metal cushion plate 504a, a stainless steel plate, a copper plate, an aluminum plate or the like can be used. As for the material of the porous bodies 504b made of carbon fibers, carbon cloth, carbon felt or the like can be used.

Carbon cloth and carbon felt are excellent in electrochemical anticorrosion and are stable against electrolytic solution, and have a large diameter of pores and are appropriate for use for reservoirs. Though it is possible to form the electrolytic solution reservoir 504 only of a carbon cloth or a carbon felt, the metal cushion plate 504a is used in the eleventh embodiment, in order to reinforce the function of alleviating the surface pressure of the electrolytic solution reservoir 504. The form of the metal cushion plate 504a is, for example, a rectangle form or a wave form and can be freely selected. The metal cushion plate 504a is inserted into a carbon cloth or a carbon felt, instead of forming the electrolytic solution reservoir 504 only of a carbon cloth or a carbon felt, and thereby, effects can be obtained, such that greater cushioning properties against surface pressure can be obtained. As a result of this, expansion of the exterior case 501 can further be lessened. In addition, the form, thickness and material of the metal cushion plate 504a can be changed while keeping the same material, that is, a carbon cloth or a carbon felt, as that which forms the porous bodies 504b, in order to change the cushioning properties of the electrolytic solution reservoir 504, and thus, effects can be obtained, such that freedom in design of the electrolytic solution reservoir 504 is increased.

This electrolytic solution reservoir 504 can be used for any of the electric double layer capacitors according to the first to tenth embodiments.

Twelfth Embodiment

Figure 36:
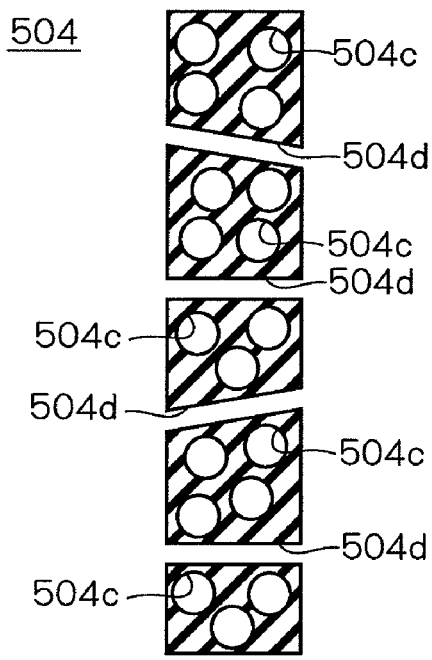
FIG. 36 is a sectional view showing the structure of an electrolytic solution reservoir according to a twelfth embodiment of the present invention.
Figure 37:
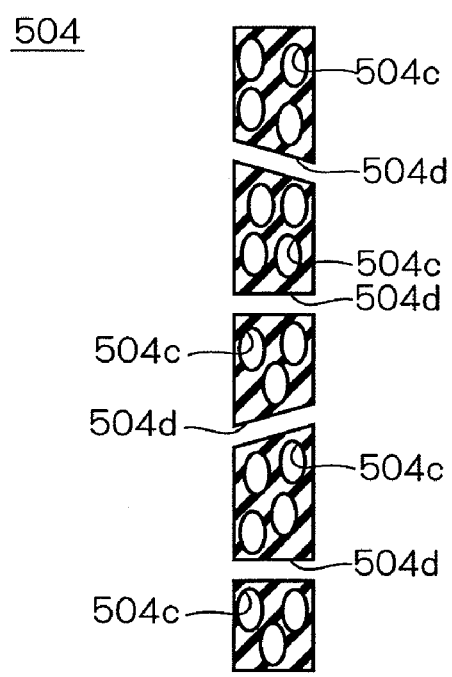
FIG. 37 is a sectional view showing the structure of the electrolytic solution reservoir according to the twelfth embodiment of the present invention.

FIGS. 36 and 37 are sectional views showing the structure of an electrolytic solution reservoir 504 according to a twelfth embodiment of the present invention. FIG. 36 shows the electrolytic solution reservoir 504 in an expanded state, and FIG. 37 shows the electrolytic solution reservoir 504 in a contracted state. The electrolytic solution reservoir 504 according to the twelfth embodiment is formed of foamed plastic having both closed pores 504c and open pores 504d. This electrolytic solution reservoir 504 can be easily formed by foaming a polymer material such as polyethylene, polypropylene or polystyrene with a gas, and after that, creating open pores by creating holes in this material.

The closed pores 504c, that is, pores which are not connected to the outside, function as a cushion, and the open pores 504d, that is, pores which are connected to the outside, function as electrolytic solution reservoirs. As the polymer material, copolymers and composite materials, in addition to single materials, can be used, and thereby, the same effects can be obtained.

The electrolytic solution reservoir 504 according to the twelfth embodiment can be used for any of the electric double layer capacitors according to the first to tenth embodiments.

As described above, an electric double layer capacitor is provided with an electrolytic solution reservoir 504 according to the present invention, and thereby, it becomes possible to operate the electric double layer capacitor under harsh conditions where the electrodes expand and contract by almost 30% whenever charging or discharging so as to absorb/discharge electrolytic solution, which is not so with other batteries, and thus, effects can be obtained, such that a great increase in the capacitance becomes possible.

Here, though in the first to tenth embodiments, a case where the present invention is applied to a layered type electric double layer capacitor, it is possible to apply the present invention to button type, box type or cylindrical type electric double layer capacitors and obtain the same effects.

While the invention has been shown and described in detail, the foregoing description is in all aspects illustrative and not restrictive. It is therefore understood that numerous modifications and variations can be devised without departing from the scope of the invention.

What is claimed is:

1. An electric double layer capacitor comprising:
a cell including
a positive electrode,
a negative electrode facing said positive electrode,
a porous separator that is impregnated with an electrolytic solution and that is disposed between said positive and negative electrodes, said positive and negative electrodes expanding upon charging of said electric double layer capacitor and contracting upon discharging of said electric double layer capacitor, and
first and second electricity collecting plates which are respectively electrically connected to said positive and negative electrodes and extend beyond said positive and negative electrodes; and
a porous electrolytic solution reservoir having a porous structure and in contact with said porous separator and impregnable with said electrolytic solution, wherein
at least one of said first and second electricity collecting plates has a first region which is not in contact with a main surface of the respective electrode to which the electricity collecting plate is connected, and a second region which is in contact with the main surface of the respective electrode to which the corresponding electricity collecting plate is electrically connected, and
said porous electrolytic solution reservoir is located facing said first region of said at least one of said first and second electricity collecting plates and is not sandwiched between the main surfaces of said positive and negative electrodes.

2. The electric double layer capacitor according to claim 1, wherein said porous electrolytic solution reservoir is sandwiched between said first and second electricity collecting plates.

3. The electric double layer capacitor according to claim 1, wherein said porous electrolytic solution reservoir includes pores having an average diameter and said porous separator includes pores having an average diameter and the average diameter of the pores of said porous electrolytic solution reservoir is larger than the average diameter of the pores of said porous separator.

4. The electric double layer capacitor according to claim 3, wherein said porous electrolytic solution reservoir is impregnated with a predetermined amount of said electrolytic solution so that an occupation ratio of said electrolytic solution within the pores of said porous separator becomes at least 50% when said electric double layer capacitor is fully charged, and the occupation ratio of said electrolytic solution within the pores of said porous electrolytic solution reservoir does not exceed 100% when said electric double layer capacitor is fully discharged.

5. The electric double layer capacitor according to claim 1, wherein said first regions of said first and second electricity conducting plates are narrower than said second regions of said first and second electricity collecting plates.

6. The electric double layer capacitor according to claim 1, wherein said porous electrolytic solution reservoir contracts when at least one of said positive electrode and said negative electrode expands, and expands when at least one of said positive electrode and said negative electrode contracts.

7. The electric double layer capacitor according to claim 1, wherein said porous electrolytic solution reservoir is located facing only said first region of said at least one of said first and second electricity collecting plates.

8. An electric double layer capacitor comprising:
a positive electrode,
a negative electrode facing said positive electrode,
a porous separator that is impregnated with an electrolytic solution and that is disposed between said positive and negative electrodes, said positive and negative electrodes expanding upon charging of said electric double layer capacitor and contracting upon discharging of said electric double layer capacitor, and
first and second electricity collecting plates which are respectively electrically connected to said positive and negative electrodes and extend beyond said positive and negative electrodes; and
a porous electrolytic solution reservoir having a porous structure and in contact with said porous separator and impregnable with said electrolytic solution, wherein
at least one of said first and second electricity collecting plates has a first region which is not in contact with a main surface of the respective electrode to which the electricity collecting plate is connected, and a second region which is in contact with the main surface of the respective electrode to which the corresponding electricity collecting plate is electrically connected,
said porous electrolytic solution reservoir is located facing said first region of said at least one of said first and second electricity collecting plates and is not sandwiched between the main surfaces of said positive and negative electrodes,
said cell further includes a third electricity collecting plate, and
said porous electrolytic solution reservoir is sandwiched between one of said first and second electricity collecting plates and said third electricity collecting plate.

9. An electric double layer capacitor comprising:
a positive electrode,
a negative electrode facing said positive electrode,
a porous separator that is impregnated with an electrolytic solution and that is disposed between said positive and negative electrodes, said positive and negative electrodes expanding upon charging of said electric double layer capacitor and contracting upon discharging of said electric double layer capacitor, and
first and second electricity collecting plates which are respectively electrically connected to said positive and negative electrodes and extend beyond said positive and negative electrodes;
a porous electrolytic solution reservoir having a porous structure and in contact with said porous separator and impregnable with said electrolytic solution, wherein
at least one of said first and second electricity collecting plates has a first region which is not in contact with a main surface of the respective electrode to which the electricity collecting plate is connected, and a second region which is in contact with the main surface of the respective electrode to which the corresponding electricity collecting plate is electrically connected,
said porous electrolytic solution reservoir is located facing said first region of said at least one of said first and second electricity collecting plates and is not sandwiched between the main surfaces of said positive and negative electrodes,
said cell includes a plurality of unit cells, each unit cell including said positive and negative electrodes and said first and second electricity collecting plates,
said porous electrolytic solution reservoir in each of said unit cells is located facing only said first region of said at least one of said first and second electricity collecting plates and is not sandwiched between the main surfaces of said positive and negative electrodes, and
said porous separator includes a single member that is folded and located between said positive and negative electrodes in each of said unit cells.

10. The electric double layer capacitor according to claim 9, wherein
said single member has a folded portion shared by two adjacent unit cells of said unit cells, and
said porous electrolytic solution reservoir is in contact with said folded portion.

* * * * *